US011674034B2

(12) United States Patent
Lenges et al.

(10) Patent No.: US 11,674,034 B2
(45) Date of Patent: Jun. 13, 2023

(54) LATEX COMPOSITIONS COMPRISING POLYSACCHARIDES

(71) Applicant: NUTRITION & BIOSCIENCES USA 4, INC., Rochester, NY (US)

(72) Inventors: Christian Peter Lenges, Wilmington, DE (US); Tizazu H. Mekonnen, Waterloo (CA)

(73) Assignee: NUTRITION & BIOSCIENCES USA 4, INC., Rochester, NY (US)

( * ) Notice: Subject to any disclaimer, the term of this patent is extended or adjusted under 35 U.S.C. 154(b) by 403 days.

(21) Appl. No.: 16/642,574

(22) PCT Filed: Aug. 24, 2018

(86) PCT No.: PCT/US2018/047940
§ 371 (c)(1),
(2) Date: Feb. 27, 2020

(87) PCT Pub. No.: WO2019/046123
PCT Pub. Date: Mar. 7, 2019

(65) Prior Publication Data
US 2020/0263026 A1 Aug. 20, 2020

Related U.S. Application Data

(60) Provisional application No. 62/553,210, filed on Sep. 1, 2017.

(51) Int. Cl.
| | |
|---|---|
| *C08L 63/00* | (2006.01) |
| *C08L 5/00* | (2006.01) |
| *C09D 7/65* | (2018.01) |
| *C09D 7/40* | (2018.01) |
| *C08L 23/08* | (2006.01) |
| *C09D 123/08* | (2006.01) |
| *C09J 11/08* | (2006.01) |
| *C09J 123/08* | (2006.01) |
| *C09J 163/00* | (2006.01) |

(52) U.S. Cl.
CPC ........... *C08L 63/00* (2013.01); *C08L 5/00* (2013.01); *C08L 23/0853* (2013.01); *C09D 7/65* (2018.01); *C09D 7/67* (2018.01); *C09D 7/68* (2018.01); *C09D 7/69* (2018.01); *C09D 123/0853* (2013.01); *C09J 11/08* (2013.01); *C09J 123/0853* (2013.01); *C09J 163/00* (2013.01); *C08L 2201/06* (2013.01); *C08L 2201/52* (2013.01)

(58) Field of Classification Search
CPC ....................................................... C08L 5/00
See application file for complete search history.

(56) References Cited

U.S. PATENT DOCUMENTS

| | | |
|---|---|---|
| 3,281,386 A | 10/1966 | Moss |
| 4,997,480 A | 3/1991 | Rao |
| 5,486,576 A | 1/1996 | Larson et al. |
| 5,702,942 A | 12/1997 | Leathers et al. |
| 6,284,479 B1* | 9/2001 | Nichols .................... C07H 1/00 435/170 |
| 6,759,473 B1 | 7/2004 | Nakamura et al. |
| 6,818,686 B1 | 11/2004 | Clpaert et al. |
| 6,869,996 B1 | 3/2005 | Krajnik et al. |
| 7,000,000 B1 | 2/2006 | O'Brien |
| 7,064,167 B2 | 6/2006 | Redding |
| 7,129,278 B2 | 10/2006 | Kayima et al. |
| 8,642,757 B2 | 2/2014 | O'Brien et al. |
| 8,785,533 B2 | 7/2014 | Chamberlain et al. |
| 9,080,195 B2 | 7/2015 | O'Brien et al. |
| 9,096,765 B2 | 8/2015 | Chamberlain et al. |
| 9,131,683 B2 | 9/2015 | Gisser et al. |
| 9,139,718 B2 | 9/2015 | Paullin et al. |
| 9,278,988 B2 | 3/2016 | Kasat et al. |
| 9,481,808 B2 | 11/2016 | Zychowski et al. |
| 10,731,297 B2* | 8/2020 | Behabtu ................. D21H 19/52 |
| 2006/0127328 A1 | 6/2006 | Monsan et al. |
| 2007/0148357 A1 | 6/2007 | Joecken et al. |
| 2010/0160551 A1 | 6/2010 | Marlow et al. |
| 2010/0291311 A1 | 11/2010 | Trouve et al. |
| 2012/0015201 A1 | 1/2012 | Zecha et al. |
| 2014/0031486 A1 | 1/2014 | Dicola et al. |
| 2015/0232785 A1 | 8/2015 | Paullin et al. |
| 2016/0347978 A1 | 12/2016 | Thompson et al. |
| 2017/0086455 A1 | 3/2017 | Gisser et al. |
| 2018/0021238 A1 | 1/2018 | Huh et al. |
| 2019/0225737 A1* | 7/2019 | Behabtu ................. C09J 175/08 |
| 2020/0079932 A1 | 3/2020 | Pietnik et al. |
| 2020/0190270 A1* | 6/2020 | Behabtu ................. C08F 136/08 |

FOREIGN PATENT DOCUMENTS

| | | | |
|---|---|---|---|
| DE | 102009001097 A1 | 2/2009 | |
| EP | 1512705 A1 | 3/2005 | |
| WO | 9404616 A1 | 3/1994 | |
| WO | 2015095358 A1 | 6/2015 | |
| WO | 2015123323 A1 | 8/2015 | |
| WO | 2016106068 A1 | 6/2016 | |
| WO | 2016126685 A1 | 8/2016 | |
| WO | WO-2016123644 A1 * | 8/2016 | ......... C08B 37/0009 |
| WO | 2017003808 A1 | 1/2017 | |
| WO | 2018017789 A1 | 1/2018 | |

OTHER PUBLICATIONS

Machine translation of WO 2016-123644 A1, published Aug. 11, 2016 << retrieved from espacenet.com on Oct. 26, 2022 >>.*
International Preliminary Report on Patentability, PCT/US2018/047940, dated Mar. 3, 2020.

* cited by examiner

Primary Examiner — Vickey Nerangis

(57) ABSTRACT

Disclosed herein are aqueous latex compositions comprising polysaccharide particles and a polymer dispersion or polymer emulsion. In one embodiment the polysaccharide particles comprise poly alpha-1,3-glucan. Also disclosed are an adhesive, film, coating, or binder comprising the latex composition in a dry form, as well as articles comprising the adhesive, film, coating, or binder.

18 Claims, 7 Drawing Sheets

LATEX COMPOSITIONS COMPRISING POLYSACCHARIDES

CROSS-REFERENCE TO RELATED APPLICATIONS

This application is the National Stage application of International Application No. PCT/US2018/47940 (filed Aug. 24, 2018), which claims priority to and the benefit of U.S. Provisional Appl. No. 62/553,210 (filed Sep. 1, 2017), both of which prior applications are incorporated herein by reference in their entirety.

FIELD OF THE DISCLOSURE

The present disclosure is directed towards latex compositions comprising polysaccharide particles, and a polymer dispersion or polymer emulsion, as well as methods of making the latex compositions. The latex compositions are useful in paints, adhesives, films, coatings, and binders.

BACKGROUND

There is a growing desire for latex compositions, such as those used in paints, adhesives, and coatings, to contain renewable and/or biodegradable materials. There is a growing need for latex compositions in which at least a portion of the incumbent ingredients are replaced with renewable and/or biodegradable materials, and which can impart improvements to properties such as hardness, hand, and gloss or matte in the coatings produced from the latex compositions.

SUMMARY

Disclosed herein are aqueous latex compositions comprising polysaccharide particles, and a polymer dispersion or polymer emulsion. In one embodiment, an aqueous latex composition is disclosed, the composition comprising: polysaccharide particles, and a polymer dispersion or polymer emulsion; wherein the polysaccharide particles comprise at least one polysaccharide comprising:
  i) poly alpha-1,3-glucan;
  ii) poly alpha-1,3-1,6-glucan;
  iii) a poly alpha-1,3-glucan ester compound represented by Structure 1:

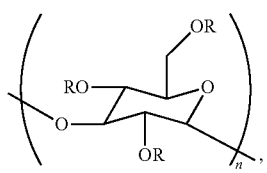

Structure 1 wherein
  (A) n is at least 6;
  (B) each R is independently an —H or a first group comprising —CO—$C_x$—COOH, wherein the —$C_x$— portion of said first group comprises a chain of 2 to 6 carbon atoms; and
  (C) the compound has a degree of substitution with the first group of about 0.001 to about 3;
  iv) a poly alpha-1,3-glucan ester compound represented by Structure 2:

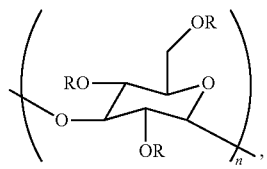

Structure 2 wherein
  (i) n is at least 6,
  (ii) each R is independently an H or an acyl group, and
  (iii) the compound has a degree of substitution of about 0.001 to about 3.0;
  v) a poly alpha-1,3-glucan ether compound represented by Structure 3:

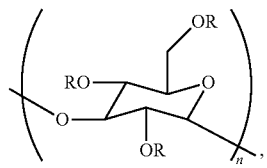

Structure 3 wherein
  (A) n is at least 6,
  (B) each R is independently an H or an organic group, and
  (C) the compound has a degree of substitution of about 0.001 to about 3.0;
  vi) a poly alpha-1,3-glucan ether compound represented by Structure 4:

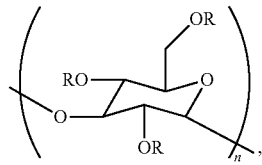

Structure 4 wherein
  (A) n is at least 6,
  (B) each R is independently an H or a positively charged organic group, and
  (C) the compound has a degree of substitution of about 0.001 to about 3.0;
  or a combination thereof.

In one embodiment, the polysaccharide particles comprise poly alpha-1,3-glucan. In a further embodiment, the polysaccharide particles have an average particle size in at least one dimension in the range of from about 20 nm to about 5000 microns. In an additional embodiment, the polysaccharide particles are present at an amount in the range of from about 0.01 weight percent polysaccharide solids to about 75 weight percent polysaccharide solids, based on the total weight of polysaccharide and polymer solids.

In one embodiment, the polymer dispersion or polymer emulsion comprises particles having an average particle size in at least one dimension in the range of from about 10 nm to about 2500 nm. In another embodiment, the polymer dispersion or polymer emulsion comprises a polymer polymerized from at least one copolymerizable monoethylenically unsaturated monomer; polyurethane; epoxy; a rubber elastomer; or a combination thereof. In one embodiment, the polymer dispersion or polymer emulsion comprises a polymer polymerized from at least one copolymerizable monoethylenically unsaturated monomer, and the monomer comprises vinyl monomers, acrylic monomers, allylic monomers, acrylamide monomers, monocarboxylic unsaturated acids, dicarboxylic unsaturated acids, or a mixture thereof. In another embodiment, the polymer dispersion or polymer emulsion comprises polyurethane or epoxy. In a further embodiment, the polymer dispersion or polymer emulsion comprises a rubber elastomer, and the rubber elastomer comprises natural rubber, synthetic polyisoprene, styrene butadiene copolymer rubber, ethylene propylene diene monomer rubber, hydrogenated nitrile butadiene rubber, polybutadiene, or neoprene.

In a further embodiment, the polymer of the polymer dispersion or polymer emulsion is present in the latex composition at an amount in the range of from about 0.5 weight percent polymer solids to about 90 weight percent polymer solids, based on the total weight of polysaccharide and polymer solids.

In yet another embodiment, the latex composition further comprises one or more additives, wherein the additive is a dispersant, rheological aid, antifoam, foaming agent, adhesion promoter, flame retardant, bactericide, fungicide, preservative, optical brightener, pigment, filler, anti-settling agent, coalescing agent, humectant, buffer, colorant, viscosity modifier, antifreeze, surfactant, binder, crosslinking agent, hardener, pH regulator, salt, thickener, plasticizer, stabilizer, extender, matting agent, or a combination thereof.

Also disclosed herein are paint formulations comprising the latex compositions. Further disclosed herein are adhesives, films, coatings, and binders comprising the latex composition in a dry form, as well as articles comprising the adhesive, film, coating, or binder. In some embodiments, the article is paper, leather, wood, metal, polymer, a fibrous substrate, or an architectural surface.

BRIEF DESCRIPTION OF THE DRAWINGS

The disclosure is illustrated by way of example and not limited to the accompanying figures.

DETAILED DESCRIPTION

Figure 1:
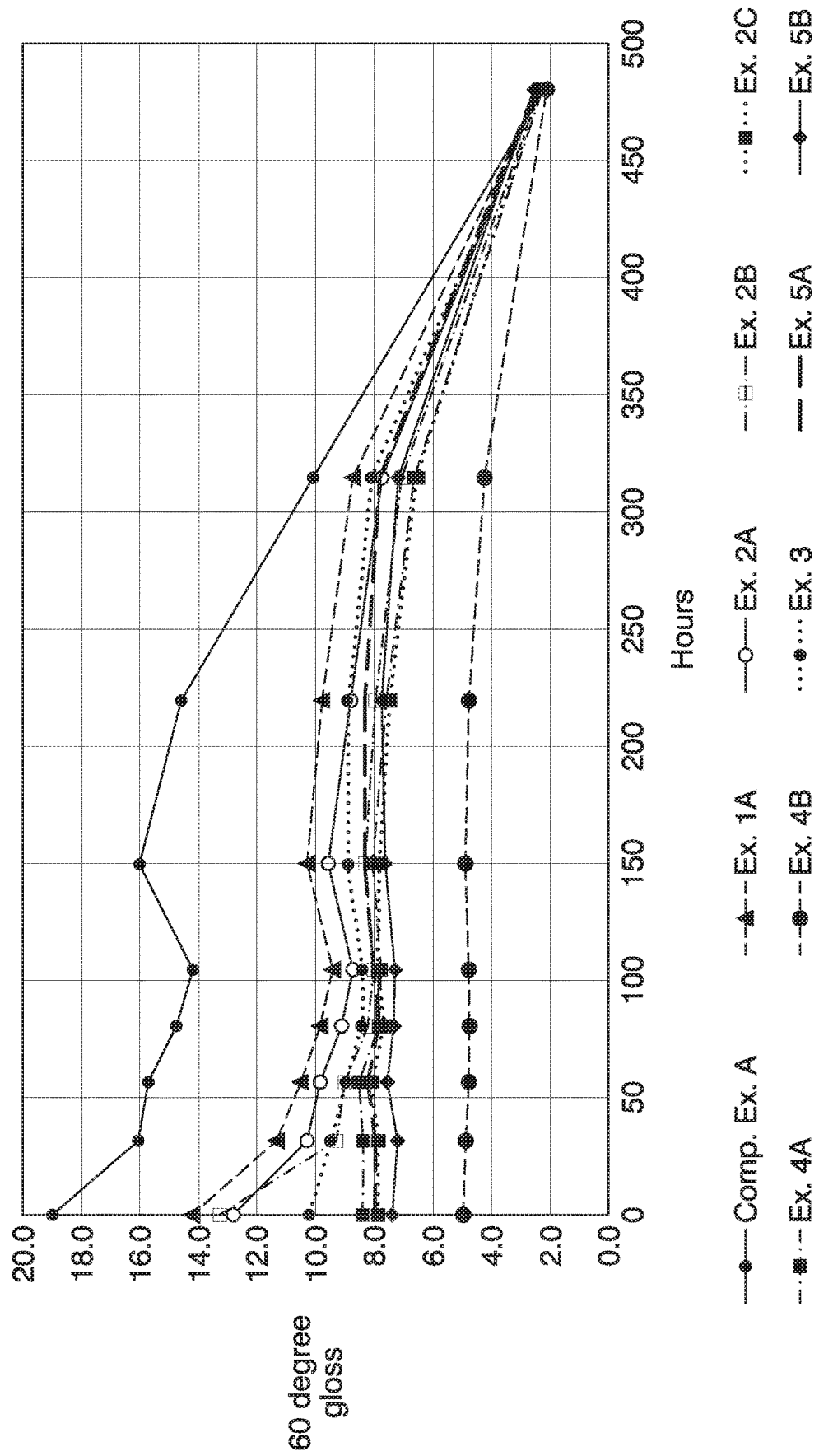
FIG. 1 is a graphical representation of the loss of gloss of the waterborne epoxy formulations of Comparative Example A and the Examples over an extended period of UV light exposure.
Figure 2:
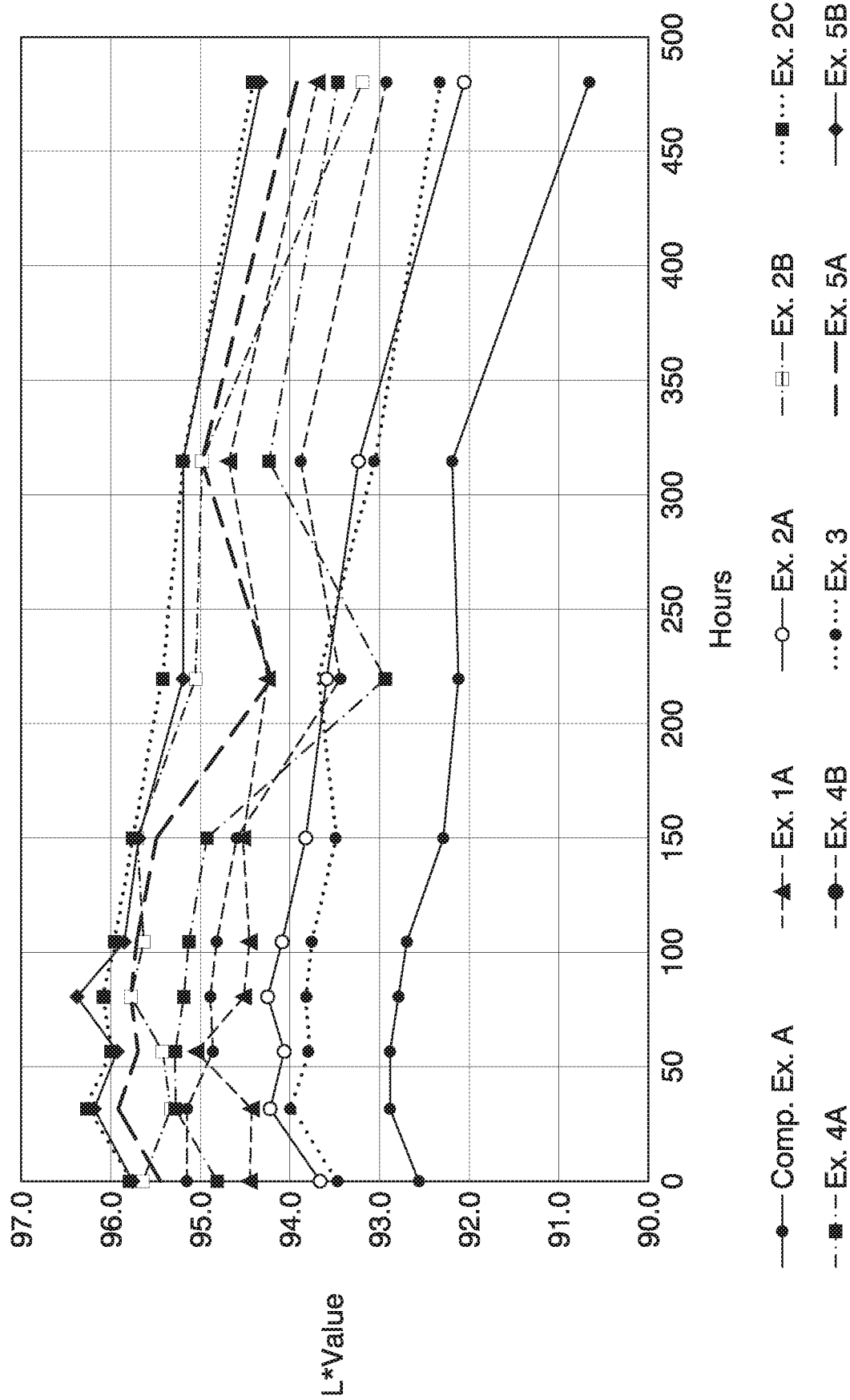
FIG. 2 is a graphical representation of the stability of whiteness of the waterborne epoxy formulations of Comparative Example A and the Examples over an extended period of UV light exposure.
Figure 3:
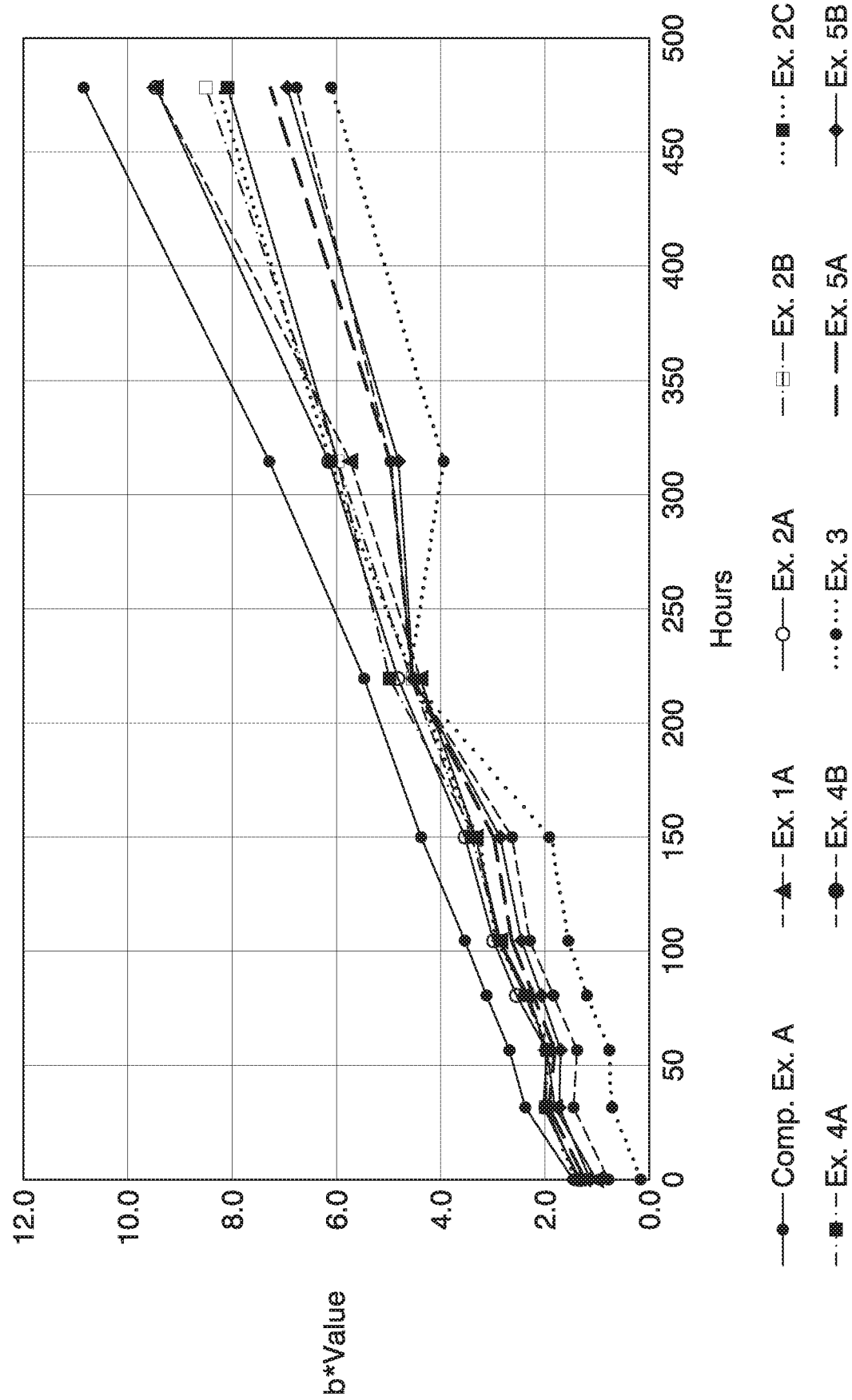
FIG. 3 is a graphical representation of the degree of yellowing of the waterborne epoxy formulations of Comparative Example A and the Examples over an extended period of UV light exposure.
Figure 4:
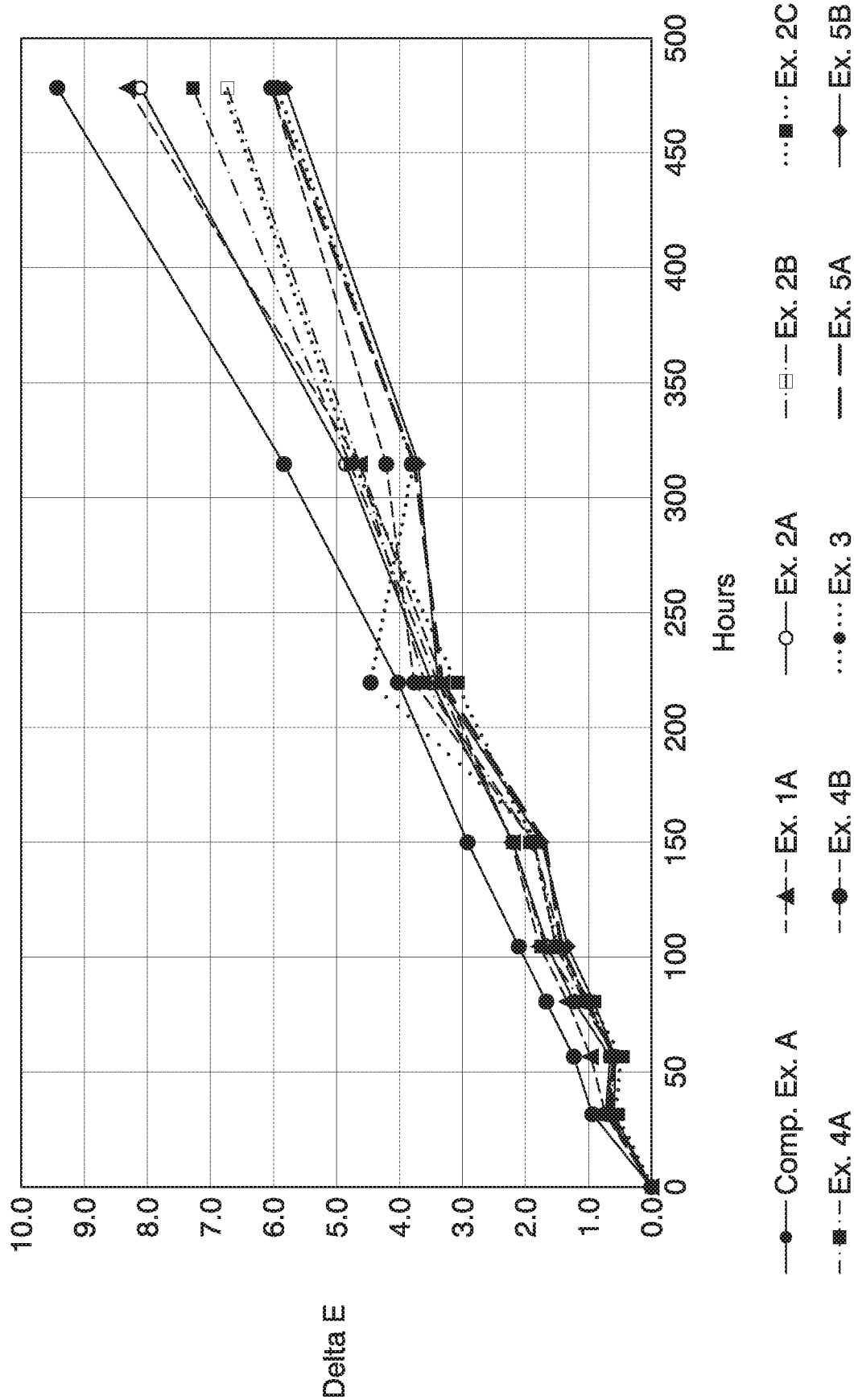
FIG. 4 is a graphical representation of the total change of color of the waterborne epoxy formulations of Comparative Example A and the Examples over an extended period of UV light exposure.

All patents, patent applications, and publications cited herein are incorporated herein by reference in their entirety.

As used herein, the term "embodiment" or "disclosure" is not meant to be limiting, but applies generally to any of the embodiments defined in the claims or described herein. These terms are used interchangeably herein.

In this disclosure, a number of terms and abbreviations are used. The following definitions apply unless specifically stated otherwise.

The articles "a", "an", and "the" preceding an element or component are intended to be nonrestrictive regarding the number of instances (i.e. occurrences) of the element or component. There "a", "an", and "the" should be read to include one or at least one, and the singular word form of the element or component also includes the plural unless the number is obviously meant to be singular.

The term "comprising" means the presence of the stated features, integers, steps, or components as referred to in the claims, but that it does not preclude the presence or addition of one or more other features, integers, steps, components, or groups thereof. The term "comprising" is intended to include embodiments encompassed by the terms "consisting essentially of" and "consisting of". Similarly, the term "consisting essentially of" is intended to include embodiments encompassed by the term "consisting of".

Where present, all ranges are inclusive and combinable. For example, when a range of "1 to 5" is recited, the recited range should be construed as including ranges "1 to 4", "1 to 3", 1-2", "1-2 and 4-5", "1-3 and 5", and the like.

As used herein in connection with a numerical value, the term "about" refers to a range of +/−0.5 of the numerical value, unless the term is otherwise specifically defined in context. For instance, the phrase a "pH value of about 6" refers to pH values of from 5.5 to 6.5, unless the pH value is specifically defined otherwise.

It is intended that every maximum numerical limitation given throughout this Specification includes every lower numerical limitation, as if such lower numerical limitations were expressly written herein. Every minimum numerical limitation given throughout this Specification will include every higher numerical limitation, as if such higher numerical limitations were expressly written herein. Every numerical range given throughout this Specification will include every narrower numerical range that falls within such broader numerical range, as if such narrower numerical ranges were all expressly written herein.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used herein:

The terms "percent by volume", "volume percent", "vol %" and "v/v %" are used interchangeably herein. The percent by volume of a solute in a solution can be determined using the formula: [(volume of solute)/(volume of solution)]×100%.

The terms "percent by weight", "weight percentage (wt %)" and "weight-weight percentage (% w/w)" are used interchangeably herein. Percent by weight refers to the percentage of a material on a mass basis as it is comprised in a composition, mixture, or solution.

The term "weight percent polysaccharide solids" as used herein refers to the percentage by weight of the polysaccharide particles in the total solids content of the latex compositions disclosed herein. The term "weight percent polymer solids" as used herein refers to the percentage by weight of the polymer in the total solids content of the latex compositions disclosed herein. "Total solids content" as used herein refers to the weight of the polysaccharide particles and the polymer dispersion or emulsion. The amount of aqueous solvent in the latex composition is excluded in calculating weight percent solids.

Weight percent polysaccharide solids is calculated from the formula $$SC_{PS} = \frac{Wt(PS)}{Wt(PS) + Wt(\text{Polymer})}$$

where $SC_{PS}$ represents "polysaccharide solids content," and Wt(PS) and Wt(Polymer) are the respective weights of the polysaccharide and the polymer present in the latex composition. The term "polysaccharide solids content" is synonymous with the concentration by weight of polysaccharide particles with respect to the total weight of solids.

Weight percent polymer solids is calculated from the formula $$SC_{Polymer} = \frac{Wt(\text{Polymer})}{Wt(PS) + Wt(\text{Polymer})}$$

where $SC_{Polymer}$ represents "polymer solids content," and Wt(Polymer) and Wt(PS) are the respective weights of the polymer and the polysaccharide particles present in the latex composition. The term "polymer solids content" is synonymous with the concentration by weight of polymer with respect to the total weight of solids.

The terms "increased", "enhanced" and "improved" are used interchangeably herein. These terms may refer to, for example, a quantity or activity that is at least 1%, 2%, 3%, 4%, 5%, 6%, 7%, 8%, 9%, 10%, 20%, 30%, 40%, 50%, 60%, 70%, 80%, 100%, 125%, 150%, 175%, or 200% (or any integer between 1% and 200%) more than the quantity or activity for which the increased quantity or activity is being compared.

The phrase "water insoluble" means that less than 5 grams of the substance, for example, the alpha-(1,3-glucan) polymer, dissolves in 100 milliliters of water at 23° C. In other embodiments, water insoluble means that less than 4 grams or 3 grams or 2 grams or 1 grams of the substance is dissolved in water at 23° C.

As used herein, the term "polysaccharide" means a polymeric carbohydrate molecule composed of long chains of monosaccharide units bound together by glycosidic linkages and on hydrolysis give the constituent monosaccharides or oligosaccharides. As used herein, the term polysaccharide includes derivatized polysaccharides wherein at least a portion of the hydroxyl groups have been converted to ester linkages ("polysaccharide ester") or to ether linkages ("polysaccharide ether").

As used herein, the term "latex" means a dispersion of polymer particles or a polymer emulsion in water. The latex compositions disclosed herein comprise polysaccharide particles and a polymer dispersion or polymer emulsion in an aqueous solution.

As used herein, the term "dispersion" means a system in which discrete, small solid particles of one material are dispersed in a continuous phase of another material, for example water.

As used herein, the term "emulsion" means a system consisting of a liquid dispersed with or without an emulsifier in an immiscible liquid usually in droplets of larger than colloidal size. As used herein, the term emulsion encompasses a uniform mixture of two immiscible liquids.

The term "fabric" as used herein refers to a woven or knitted material having a network of natural and/or artificial fibers or yarns.

The term "textile" as used herein refers to garments and other articles fabricated from fibers, yarns, or fabrics when the products retain the characteristic flexibility and drape of the original fabrics.

The term "fiber" as used herein refers to an elongate body the length dimension of which is much greater than the transverse dimensions of width and thickness. Accordingly, the term fiber includes monofilament fiber, multifilament fiber, ribbon, strip, a plurality of any one or combinations thereof and the like having regular or irregular cross-section.

The term "yarn" as used herein refers to a continuous strand of fibers.

As used herein, "weight average molecular weight" or "$M_w$" is calculated as $M_w = \Sigma N_i M_i^2 / \Sigma N_i M_i$; where $M_i$ is the molecular weight of a chain and $N_i$ is the number of chains of that molecular weight. The weight average molecular weight can be determined by techniques such as static light scattering, gas chromatography (GC), high pressure liquid chromatography (HPLC), gel permeation chromatography (GPC), small angle neutron scattering, X-ray scattering, and sedimentation velocity.

As used herein, "number average molecular weight" or "$M_n$" refers to the statistical average molecular weight of all the polymer chains in a sample. The number average molecular weight is calculated as $M_n = \Sigma N_i M_i / \Sigma N_i$ where $M_i$ is the molecular weight of a chain and $N_i$ is the number of chains of that molecular weight. The number average molecular weight of a polymer can be determined by techniques such as gel permeation chromatography, viscometry via the (Mark-Houwink equation), and colligative methods such as vapor pressure osmometry, end-group determination or proton NMR.

The present disclosure is directed to latex compositions comprising polysaccharide particles, and a polymer dispersion or a polymer emulsion dispersed in an aqueous solution. Also disclosed are methods of making the latex composition, as well as paint formulations comprising the latex compositions and adhesives, films, coatings (including paint), or binders comprising the latex composition in a dry form. Further disclosed are articles comprising the paint, adhesives, films, coatings or binders. The articles can be paper, leather, wood, metal, polymer, a fibrous substrate, or an architectural surface. The paint, adhesives, film, coatings or binders comprising the latex formulation in a dry form can provide benefits such as increased coating hardness, improved dry time, improved fade resistance, lower blistering, and improved hand (i.e., a less tacky or sticky feel).

The polysaccharide particles can comprise i) poly alpha-1,3-glucan;

ii) poly alpha-1,3-1,6-glucan;

iii) a poly alpha-1,3-glucan ester compound represented by Structure 1:

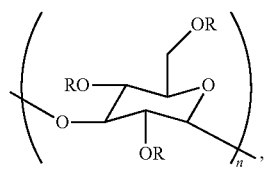

Structure 1 wherein (A) n is at least 6;

(B) each R is independently an —H or a first group comprising —CO—$C_x$—COOH, wherein the —$C_x$— portion of said first group comprises a chain of 2 to 6 carbon atoms; and (C) the compound has a degree of substitution with the first group of about 0.001 to about 3;

iv) a poly alpha-1,3-glucan ester compound represented by Structure 2:

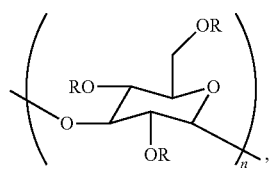

Structure 2 wherein (i) n is at least 6, (ii) each R is independently an H or an acyl group, and (iii) the compound has a degree of substitution of about 0.001 to about 3.0.

v) a poly alpha-1,3-glucan ether compound represented by Structure 3:

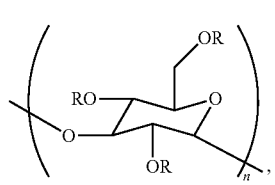

Structure 3 wherein (A) n is at least 6, (B) each R is independently an H or an organic group, and (C) the compound has a degree of substitution of about 0.001 to about 3.0;

vi) a poly alpha-1,3-glucan ether compound represented by Structure 4:

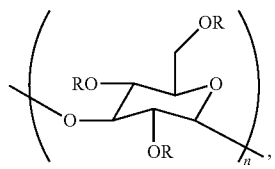

Structure 4 wherein (A) n is at least 6, (B) each R is independently an H or a positively charged organic group, and (C) the compound has a degree of substitution of about 0.001 to about 3.0.

Combinations of such polysaccharide particles can also be used. As used herein, the term "combinations" encompasses both combinations within and combinations between the polysaccharide types, for example combinations within poly alpha-1,3-glucan ester compounds (i.e. poly alpha-1,3-glucan succinate and poly alpha-1,3-glucan maleate, for example), and also combinations between the polysaccharide types (i.e. poly alpha-1,3-glucan ester compounds and poly alpha-1,3-glucan ether compounds, for example).

In the latex compositions disclosed herein, the polysaccharide particles are insoluble in the aqueous solution in which the particles are dispersed. Thus, the characteristics of the polysaccharide, such as molecular weight (degree of polymerization), degree of substitution, specific substituents, and ester or ether derivatization are selected to provide polysaccharide particles which are insoluble in the aqueous solution.

In one embodiment, the polysaccharide particles have an average particle size in at least one dimension in the range of from about 20 nm to about 5000 microns (5,000,000 nm). For example, the average particle size in at least one dimension can be 20; 30; 40; 50; 60; 70; 80; 90; 100; 150; 200; 250; 300; 350; 400; 450; 500; 550; 600; 700; 800; 900; 1000; 1500; 2000; 2500; 5000; 7500; 10,000; 15,000; 20,000; 30,000; 40,000; 50,000; 60,000; 70,000; 80,000; 90,000; 100,000; 125,000; 150,000; 175,000; 200,000; 500,000; 1,000,000; 1,500,000; 2,000,000; 2,500,000; 3,000,000; 3,500,000; 4,000,000; 4,500,000, or 5,000,000 (or any value between 20 and 200,000) nm. In some embodiments, useful polysaccharide particles have an average particle size in at least one dimension which is greater than about 5000 microns. In another embodiment, the polysaccharide particles have an average particle size in at least one dimension in the range of from about 20 nm to about 200 μm (200,000 nm). In yet another embodiment, the at least a portion of the polysaccharide particles have an aspect ratio of about 1. In an additional embodiment, the majority of the polysaccharide particles have an aspect ratio of about 1. Particle size and aspect ratio can be determined by methods known in the art.

In the latex composition, the polysaccharide particles can be used in the form of a colloidal dispersion, wet cake, dry powder, or a combination thereof. In one embodiment, the polysaccharide particles can be used in the form of a colloidal dispersion. As used herein, the term "colloidal dispersion" refers to a heterogeneous system having a dispersed phase and a dispersion medium, i.e., microscopically dispersed insoluble particles are suspended throughout another substance, for example water or an aqueous solution. An example of a colloidal dispersion in water is a hydrocolloid. The colloidal dispersion may be a stable colloidal dispersion or an unstable colloidal dispersion. The stable colloidal dispersion is stable at room temperature and/or at elevated temperature, for example, between 40 and 50° C. for a period of at least one month with no visible settling. The unstable dispersion, under the same conditions, may see at least a portion of the polysaccharide settle out of the dispersion. Agitation of the settled material will generally re-form the colloidal dispersion. In some embodiments, the colloidal dispersion is a stable dispersion. In other embodiments, the colloidal dispersion is an unstable dispersion. Colloidal dispersions of polysaccharides such as poly alpha-1,3-glucan or poly alpha-1,3-1,6-glucan can be prepared by dispersing the wet cake in water to form a polysaccharide colloidal dispersion, for example as disclosed in published patent application WO 2016/126685, which is incorporated herein in its entirety.

In another embodiment, the polysaccharide particles can be in the form of a wet cake, for example containing greater than 5% by weight of water. A glucan wet cake is formed from a glucan colloidal dispersion by removing water by filtration. Water remains on the surface of glucan solid particles and trapped between particles. Whereas the glucan colloidal dispersion is a pourable liquid, the wet cake has a soft solid-like consistency. The term "poly alpha-1,3-glucan wet cake" herein refers to poly alpha-1,3-glucan that has been separated from a slurry and washed with water or an aqueous solution. Poly alpha-1,3-glucan or other polysaccharide is not dried when preparing a wet cake.

In yet another embodiment, the polysaccharide particles can be used in the form of a dry powder. Dry powder can be obtained, for example, by drying wet cake under vacuum, then optionally grinding the dried material to a desired particle size.

In one embodiment, the polysaccharide particles comprise poly alpha-1,3-glucan. The term "glucan" herein refers to a polysaccharide of D-glucose monomers that are linked by glycosidic linkages. Poly alpha-1,3-glucan is a polymer comprising glucose monomeric units linked together by glycosidic linkages, wherein at least 50% of the glycosidic linkages are alpha-1,3-glycosidic linkages. Poly alpha-1,3-glucan is a type of polysaccharide. The structure of poly alpha-1,3-glucan can be illustrated as follows:

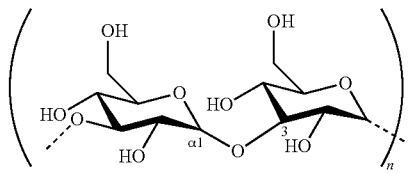

Poly alpha-1,3-glucan can be enzymatically produced from sucrose using one or more glucosyltransferase (gtf) enzymes, as described in U.S. Pat. Nos. 7,000,000; 8,642,757; and 9,080195, for example.

The process to produce poly alpha-1,3-glucan from sucrose using, for example, a glucosyl transferase enzyme, can result in a slurry of the poly alpha-1,3-glucan in water. The slurry can be filtered to remove some of the water, giving the solid poly alpha-1,3-glucan as a wet cake containing in the range of from 30 to 50 percent by weight of poly alpha-1,3-glucan, with the remainder being water. In some embodiments, the wet cake comprises in the range of from 35 to 45 percent by weight of the poly alpha-1,3-glucan. The wet cake can be washed with water to remove any water soluble impurities, for example, sucrose, fructose, or phosphate buffers. In some embodiments, the wet cake comprising the poly alpha-1,3-glucan can be used as is. In other embodiments, the wet cake can be further dried under reduced pressure, at elevated temperature, by freeze drying, or a combination thereof, to give a powder comprising greater than or equal to 50 percent by weight of the poly alpha-1,3-glucan. In some embodiments, the poly alpha-1,3-glucan can be a powder, comprising less than or equal to 20 percent by weight water. In other embodiments, the poly alpha-1,3-glucan can be a dry powder comprising less than or equal to 15, 14, 13, 12, 11, 10, 9, 8, 7, 6, 5, 4, 3, 2, or 1 percent by weight water.

In some embodiments, the percentage of glycosidic linkages between the glucose monomer units of the poly alpha-1,3-glucan that are alpha-1,3 is greater than or equal to 50%, 60%, 70%, 80%, 90%, 95%, 96%, 97%, 98%, 99%, or 100% (or any integer value between 50% and 100%). In such embodiments, accordingly, poly alpha-1,3-glucan has less than or equal to 50%, 40%, 30%, 20%, 10%, 5%, 4%, 3%, 2%, 1%, or 0% (or any integer value between 0% and 50%) of glycosidic linkages that are not alpha-1,3.

The terms "glycosidic linkage" and "glycosidic bond" are used interchangeably herein and refer to the type of covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. This linkage is illustrated in the poly alpha-1,3-glucan structure provided above. Herein, "alpha-D-glucose" will be referred to as "glucose". All glycosidic linkages disclosed herein are alpha-glycosidic linkages, except where otherwise noted.

The "molecular weight" of poly alpha-1,3-glucan can be represented as number-average molecular weight ($M_n$) or as weight-average molecular weight ($M_w$). Alternatively, molecular weight can be represented as Daltons, grams/mole, DPw (weight average degree of polymerization), or DPn (number average degree of polymerization). Various means are known in the art for calculating these molecular weight measurements, such as high-pressure liquid chromatography (HPLC), size exclusion chromatography (SEC), or gel permeation chromatography (GPC).

The poly alpha-1,3-glucan may have a weight average degree of polymerisation (DPw) of at least about 400. In some embodiments, the poly alpha-1,3-glucan has a DPw of from about 400 to about 1400, or from about 400 to about 1000, or from about 500 to about 900.

In one embodiment, the polysaccharide particles comprise poly alpha-1,3-1,6-glucan. In one embodiment, the polysaccharide particles comprise poly alpha-1,3-1,6-glucan wherein (i) at least 30% of the glycosidic linkages of the poly alpha-1,3-1,6-glucan are alpha-1,3 linkages, (ii) at least 30% of the glycosidic linkages of the poly alpha-1,3-1,6-glucan are alpha-1,6 linkages, (iii) the poly alpha-1,3-1,6-glucan has a weight average degree of polymerization (DPw) of at least 1000; and (iv) the alpha-1,3 linkages and alpha-1,6 linkages of the poly alpha-1,3-1,6-glucan do not consecutively alternate with each other. In another embodiment, at least 60% of the glycosidic linkages of the poly alpha-1,3-1,6-glucan are alpha-1,6 linkages. The term "alpha-1,6-glycosidic linkage" as used herein refers to the covalent bond that joins alpha-D-glucose molecules to each other through carbons 1 and 6 on adjacent alpha-D-glucose rings.

Poly alpha-1,3-1,6-glucan is a product of a glucosyltransferase enzyme, as disclosed in United States Patent Application Publication 2015/0232785 A1 and in published patent application WO 2015/123323, which are incorporated herein in their entirety.

The glycosidic linkage profile of a glucan or a substituted glucan can be determined using any method known in the art. For example, a linkage profile can be determined using methods that use nuclear magnetic resonance (NMR) spectroscopy (e.g., $^{13}$C NMR or $^1$H NMR). These and other methods that can be used are disclosed in *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, Fla., 2005), which is incorporated herein by reference.

Poly alpha-1,3-1,6-glucan herein is a polymer comprising glucose monomeric units linked together by glycosidic linkages (i.e., glucosidic linkages), wherein at least about 30% of the glycosidic linkages are alpha-1,3-glycosidic linkages, and at least about 30% of the glycosidic linkages are alpha-1,6-glycosidic linkages. Poly alpha-1,3-1,6-glucan is a type of polysaccharide containing a mixed glycosidic linkage content. The meaning of the term poly alpha-1,3-1,6-glucan in certain embodiments herein excludes "alternan," which is a glucan containing alpha-1,3 linkages and alpha-1,6 linkages that consecutively alternate with each other (U.S. Pat. No. 5,702,942, U.S. Pat. Appl. Publ. No. 2006/0127328). Alpha-1,3 and alpha-1,6 linkages that "consecutively alternate" with each other can be visually represented by . . . G-1,3-G-1,6-G-1,3-G-1,6-G-1,3-G-1,6-G-1,3-G- . . . , for example, where G represents glucose.

The "molecular weight" of a poly alpha-1,3-1,6-glucan herein can be represented as number-average molecular weight ($M_n$) or as weight-average molecular weight ($M_w$). Alternatively, molecular weight can be represented as Daltons, grams/mole, $DP_w$ (weight average degree of polymerization), or $DP_n$ (number average degree of polymerization). Various means are known in the art for calculating these molecular weight measurements such as with high-pressure liquid chromatography (HPLC), size exclusion chromatography (SEC), or gel permeation chromatography (GPC).

At least 30% of the glycosidic linkages of poly alpha-1, 3-1,6-glucan are alpha-1,3 linkages, and at least 30% of the glycosidic linkages of the poly alpha-1,3-1,6-glucan are alpha-1,6 linkages. Alternatively, the percentage of alpha-1,3 linkages in poly alpha-1,3-1,6-glucan herein can be at least 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, or 64%. Alternatively still, the percentage of alpha-1,6 linkages in poly alpha-1,3-1,6-glucan herein can be at least 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, or 69%.

A poly alpha-1,3-1,6-glucan can have any one the aforementioned percentages of alpha-1,3 linkages and any one of the aforementioned percentages of alpha-1,6 linkages, just so long that the total of the percentages is not greater than 100%. For example, poly alpha-1,3-1,6-glucan herein can have (i) any one of 30%, 31%, 32%, 33%, 34%, 35%, 36%, 37%, 38%, 39%, or 40% (30%-40%) alpha-1,3 linkages and (ii) any one of 60%, 61%, 62%, 63%, 64%, 65%, 66%, 67%, 68%, or 69% (60%-69%) alpha-1,6 linkages, just so long that the total of the percentages is not greater than 100%. Non-limiting examples include poly alpha-1,3-1,6-glucan with 31% alpha-1,3 linkages and 67% alpha-1,6 linkages. In certain embodiments, at least 60% of the glycosidic linkages of the poly alpha-1,3-1,6-glucan are alpha-1,6 linkages.

A poly alpha-1,3-1,6-glucan can have, for example, less than 10%, 9%, 8%, 7%, 6%, 5%, 4%, 3%, 2%, or 1% of glycosidic linkages other than alpha-1,3 and alpha-1,6. In another embodiment, a poly alpha-1,3-1,6-glucan only has alpha-1,3 and alpha-1,6 linkages.

Other examples of alpha-1,3 and alpha-1,6 linkage profiles and methods for their product are disclosed in published United States patent application 2015/0232785, which is incorporated herein by reference in its entirety.

The backbone of a poly alpha-1,3-1,6-glucan can be linear/unbranched. Alternatively, there can be branches in the poly alpha-1,3-1,6-glucan. A poly alpha-1,3-1,6-glucan in certain embodiments can thus have no branch points or less than about 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% branch points as a percent of the glycosidic linkages in the polymer.

The alpha-1,3 linkages and alpha-1,6 linkages of a poly alpha-1,3-1,6-glucan do not consecutively alternate with each other. For the following discussion, consider that . . . G-1,3-G-1,6-G-1,3-G-1,6-G-1,3-G- . . . (where G represents glucose) represents a stretch of six glucose monomeric units linked by consecutively alternating alpha-1,3 linkages and alpha-1,6 linkages. Poly alpha-1,3-1,6-glucan in certain embodiments herein comprises less than 2, 3, 4, 5, 6, 7, 8, 9, 10, or more glucose monomeric units that are linked consecutively with alternating alpha-1,3 and alpha-1,6 linkages.

The molecular weight of a poly alpha-1,3-1,6-glucan can be measured as $DP_w$ (weight average degree of polymerization) or $DP_n$ (number average degree of polymerization). Alternatively, molecular weight can be measured in Daltons or grams/mole. It may also be useful to refer to the number-average molecular weight ($M_n$) or weight-average molecular weight ($M_w$) of the poly alpha-1,3-1,6-glucan.

A poly alpha-1,3-1,6-glucan herein can have a $DP_w$ of at least about 1000. For example, the $DP_w$ of the poly alpha-1,3-1,6-glucan can be at least about 10000. Alternatively, the $DP_w$ can be at least about 1000 to about 15000. Alternatively still, the $DP_w$ can be at least about 1000, 2000, 3000, 4000, 5000, 6000, 7000, 8000, 9000, 10000, 11000, 12000, 13000, 14000, or 15000 (or any integer between 1000 and 15000), for example. Given that a poly alpha-1,3-1,6-glucan herein can have a $DP_w$ of at least about 1000, such a glucan polymer is typically water-insoluble.

A poly alpha-1,3-1,6-glucan herein can have an $M_w$ of at least about 50000, 100000, 200000, 300000, 400000, 500000, 600000, 700000, 800000, 900000, 1000000, 1100000, 1200000, 1300000, 1400000, 1500000, or 1600000 (or any integer between 50000 and 1600000), for example. The $M_w$ in certain embodiments is at least about 1000000. Alternatively, poly alpha-1,3-1,6-glucan can have an $M_w$ of at least about 4000, 5000, 10000, 20000, 30000, or 40000, for example.

A poly alpha-1,3-1,6-glucan herein can comprise at least 20 glucose monomeric units, for example. Alternatively, the number of glucose monomeric units can be at least 25, 50, 100, 500, 1000, 2000, 3000, 4000, 5000, 6000, 7000, 8000, or 9000 (or any integer between 10 and 9000), for example.

Poly alpha-1,3-1,6-glucan herein can be provided in the form of a powder when dry, or a paste, colloid or other dispersion when wet, for example.

In another embodiment, the polysaccharide particles comprise a poly alpha-1,3-glucan ester compound represented by Structure 1:

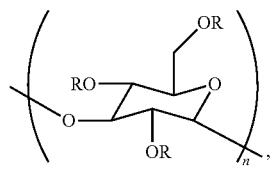

Structure 1 wherein
(i) n is at least 6;
(ii) each R is independently an —H or a first group comprising —CO—$C_x$—COOH, wherein the —$C_x$— portion of said first group comprises a chain of 2 to 6 carbon atoms; and
(iii) the compound has a degree of substitution with the first group of about 0.001 to about 3.

Such poly alpha-1,3-glucan esters and their preparation are disclosed in published patent application WO 2017/003808, which is incorporated herein by reference in its entirety. Under suitable reaction conditions (e.g., time, temperature, pH), esterification of one or more hydroxyl groups of the glucose units of poly alpha-1,3-glucan with a first group provided by a cyclic organic anhydride can occur, yielding a poly alpha-1,3-glucan ester compound of Structure 1.

A poly alpha-1,3-glucan ester compound of Structure 1 is termed an "ester" herein by virtue of comprising the substructure —CG-O—CO—$C_x$—, where "—CG-" represents carbon 2, 4, or 6 of a glucose monomeric unit of a poly alpha-1,3-glucan ester compound, and where "—CO—$C_x$—" is comprised in the first group.

A "first group" herein comprises —CO—$C_x$—COOH. The term "—$C_x$—" refers to a portion of the first group that typically comprises a chain of 2 to 6 carbon atoms, each carbon atom preferably having four covalent bonds.

A poly alpha-1,3-glucan monoester contains one type of first group. The terms "poly alpha-1,3-glucan mixed ester" and "mixed ester" are used interchangeably herein. A poly alpha-1,3-glucan mixed ester contains two or more types of a first group.

A cyclic organic anhydride herein can have a formula represented by Structure 5 shown below:

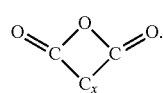

Structure 5

The —$C_x$— portion of Structure 5 typically comprises a chain of 2 to 6 carbon atoms; each carbon atom in this chain preferably has four covalent bonds. It is contemplated that, in some embodiments, the —$C_x$— portion can comprise a chain of 2 to 16, 2 to 17, or 2 to 18 carbon atoms. During an esterification reaction herein, the anhydride group (—CO—O—CO—) of a cyclic organic anhydride breaks such that one end of the broken anhydride becomes a —COOH group and the other end is esterified to a hydroxyl group of poly alpha-1,3-glucan, thereby rendering an esterified first group (—CO—$C_x$—COOH). Depending on the cyclic organic anhydride used, there typically can be one or two possible products of such an esterification reaction.

Each R group in the formula of a poly alpha-1,3-glucan ester compound represented by Structure 1 can independently be an —H or a first group comprising —CO—$C_x$—COOH. In general, each carbon in the chain, aside from being covalently bonded with an adjacent carbon atom(s) in the chain or a carbon atom of the flanking C=O and COOH groups, can also be bonded to hydrogen(s), a substituent group(s) such as an organic group, and/or be involved in a carbon-carbon double-bond. For example, a carbon atom in the —$C_x$— chain can be saturated (i.e., —$CH_2$—), double-bonded with an adjacent carbon atom in the —$C_x$— chain (e.g., —CH=CH—), and/or be bonded to a hydrogen and an organic group (i.e., one hydrogen is substituted with an organic group).

In certain embodiments, the —$C_x$— portion of the first group (—CO—$C_x$—COOH) comprises only $CH_2$ groups. Examples of a first group in which the —$C_x$— portion comprises only $CH_2$ groups are —CO—$CH_2$—$CH_2$—COOH, —CO—$CH_2$—$CH_2$—$CH_2$—COOH, —CO—$CH_2$—$CH_2$—$CH_2$—$CH_2$—COOH, —CO—$CH_2$—$CH_2$—$CH_2$—$CH_2$—$CH_2$—COOH, and —CO—$CH_2$—$CH_2$—$CH_2$—$CH_2$—$CH_2$—$CH_2$—COOH. These first groups can be derived, respectively, by reacting succinic anhydride, glutaric anhydride, adipic anhydride, pimelic anhydride, or suberic anhydride with poly alpha-1,3-glucan.

In some embodiments, the —$C_x$— portion of the first group (—CO—$C_x$—COOH) can comprise (i) at least one double-bond in the carbon atom chain, and/or (ii) at least one branch comprising an organic group. For instance, the —$C_x$— portion of the first group can have at least one double-bond in the carbon atom chain. Examples of a first group in which the —$C_x$— portion comprises a carbon-carbon double-bond include —CO—CH=CH—COOH, —CO—CH=CH—$CH_2$—COOH, —CO—CH=CH—$CH_2$—$CH_2$—COOH, —CO—CH=CH—$CH_2$—$CH_2$—$CH_2$—COOH, —CO—CH=CH—$CH_2$—$CH_2$—$CH_2$—$CH_2$—COOH, —CO—$CH_2$—CH=CH—COOH, —CO—$CH_2$—CH=CH—$CH_2$—COOH, —CO—$CH_2$—CH=CH—$CH_2$—$CH_2$—COOH, —CO—$CH_2$—$CH_2$—CH=CH—COOH, —CO—$CH_2$—$CH_2$—CH=CH—$CH_2$—COOH, —CO—$CH_2$—$CH_2$—$CH_2$—CH=CH—COOH, —CO—$CH_2$—$CH_2$—$CH_2$—CH=CH—$CH_2$—COOH, —CO—$CH_2$—$CH_2$—$CH_2$—$CH_2$—CH=CH—COOH, —CO—CH₂—CH₂—CH₂—CH═CH—CH₂—COOH, and —CO—CH₂—CH₂—CH₂—CH₂—CH═CH—COOH.

Each of these first groups comprising a —C$_x$— portion with at least one organic group branch can be derived by reacting the appropriate cyclic organic anhydride with poly alpha-1,3-glucan. An illustrative example includes using methylsuccinic anhydride to ester-derivatize poly alpha-1,3-glucan, where the resultant first group is —CO—CH₂—CH(CH₃)—COOH or —CO—CH(CH₃)—CH₂—COOH. As another example, to produce a first group comprising —CO—CH═CH—COOH, maleic anhydride can be reacted with poly alpha-1,3-glucan. Thus, a cyclic organic anhydride comprising a —C$_x$— portion represented in any of the above-listed first groups (where the corresponding —C$_x$— portion of a cyclic organic anhydride is that portion linking each side of the anhydride group [—CO—O—CO—] together to form a cycle) can be reacted with poly alpha-1,3-glucan to produce an ester thereof having the corresponding first group (—CO—C$_x$—COOH).

Poly alpha-1,3-glucan ester compounds in certain embodiments can contain one type of a first group comprising —CO—C$_x$—COOH. For example, one or more R groups ester-linked to the glucose group in the above formula may be —CO—CH₂—CH₂—COOH; the R groups in this particular example would thus independently be hydrogen and —CO—CH₂—CH₂—COOH groups (such an ester compound can be referred to as poly alpha-1,3-glucan succinate).

The —C$_x$— portion of the first group (—CO—C$_x$—COOH) in some aspects herein can comprise at least one branch comprising an organic group. Examples of a first group in which the —C$_x$— portion comprises at least one organic group branch include:

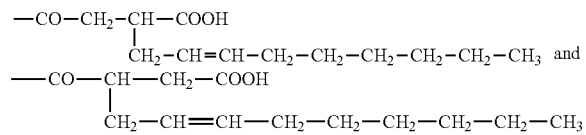

Each of these two first groups can be derived by reacting 2-nonen-1-yl succinic anhydride with poly alpha-1,3-glucan. It can be seen that the organic group branch (generically termed "Rb" herein) in both these examples is —CH₂—CH═CH—CH₂—CH₂—CH₂—CH₂—CH₂—CH₃. It can also be seen that the Rb group substitutes for a hydrogen in the —C$_x$— carbon chain.

Thus, for example, a first group (—CO—C$_x$—COOH) herein can be any of —CO—CH₂—CH₂—COOH, —CO—CH₂—CH₂—CH₂—COOH, —CO—CH₂—CH₂—CH₂—CH₂—COOH, —CO—CH₂—CH₂—CH₂—CH₂—CH₂—COOH, or —CO—CH₂—CH₂—CH₂—CH₂—CH₂—CH₂—COOH, but in which at least one, two, three, or more hydrogens thereof is/are substituted with an Rb group. Also for example, a first group (—CO—C$_x$—COOH) herein can be any of —CO—CH═CH—CH₂—COOH, —CO—CH═CH—CH₂—CH₂—COOH, —CO—CH═CH—CH₂—CH₂—CH₂—COOH, —CO—CH═CH—CH₂—CH₂—CH₂—CH₂—COOH, —CO—CH₂—CH═CH—CH₂—COOH, —CO—CH₂—CH═CH—CH₂—CH₂—COOH, —CO—CH₂—CH═CH—CH₂—CH₂—CH₂—COOH, —CO—CH₂—CH═CH—CH₂—CH₂—CH₂—CH₂—COOH, —CO—CH₂—CH₂—CH═CH—COOH, —CO—CH₂—CH₂—CH═CH—CH₂—COOH, —CO—CH₂—CH₂—CH═CH—CH₂—CH₂—COOH, —CO—CH₂—CH₂—CH₂—CH═CH—COOH, —CO—CH₂—CH₂—CH₂—CH═CH—CH₂—COOH, —CO—CH₂—CH₂—CH₂—CH═CH—CH₂—COOH, —CO—CH₂—CH₂—CH₂—CH₂—CH═CH—COOH, or —CO—CH₂—CH₂—CH₂—CH₂—CH═CH—COOH, but in which at least one, two, three, or more hydrogens thereof is/are substituted with an Rb group (such first groups are examples in which the —C$_x$— portion comprises at least one double-bond in the carbon atom chain and at least one branch comprising an organic group). Suitable examples of Rb groups herein include alkyl groups and alkenyl groups. An alkyl group herein can comprise 1-18 carbons (linear or branched), for example (e.g., methyl, ethyl, propyl, butyl, pentyl, hexyl, heptyl, octyl, nonyl, or decyl group). An alkenyl group herein can comprise 1-18 carbons (linear or branched), for example (e.g., methylene, ethenyl, propenyl, butenyl, pentenyl, hexenyl, heptenyl, octenyl [e.g., 2-octenyl], nonenyl [e.g., 2-nonenyl], or decenyl group). One of skill in the art would understand, based on the formula of the cyclic organic anhydride represented by Structure 5 and its involvement in the esterification process to prepare poly alpha-1,3-glucan esters of Structure 1 herein as disclosed in WO 2017/003808, what particular cyclic organic anhydride is suitable for deriving any of these first groups.

Examples of cyclic organic anhydrides by name that can be included in a reaction with poly alpha-1,3-glucan to form a poly alpha-1,3-glucan ester compound represented by Structure 1 include maleic anhydride, methylsuccinic anhydride, methylmaleic anhydride, dimethylmaleic anhydride, 2-ethyl-3-methylmaleic anhydride, 2-hexyl-3-methylmaleic anhydride, 2-ethyl-3-methyl-2-pentenedioic anhydride, itaconic anhydride (2-methylenesuccinic anhydride), 2-nonen-1-yl succinic anhydride, and 2-octen-1-yl succinic anhydride. Alkenyl succinic anhydrides and alkylketene dimers, for example those derived from palmitic acid or other long chain carboxylic acids, can also be used. In particular, for example, maleic anhydride can be used to esterify —CO—CH═CH—COOH as a first group to poly alpha-1,3-glucan; methylsuccinic anhydride can be used to esterify —CO—CH₂—CH(CH₃)—COOH and/or —CO—CH(CH₃)—CH₂—COOH as a first group to poly alpha-1,3-glucan; methylmaleic anhydride can be used to esterify —CO—CH═C(CH₃)—COOH and/or —CO—C(CH₃)═CH—COOH as a first group to poly alpha-1,3-glucan; dimethylmaleic anhydride can be used to esterify —CO—C(CH₃)═C(CH₃)—COOH as a first group to poly alpha-1,3-glucan; 2-ethyl-3-methylmaleic anhydride can be used to esterify —CO—C(CH₂CH₃)═C(CH₃)—COOH and/or —CO—C(CH₃)═C(CH₂CH₃)—COOH as a first group to poly alpha-1,3-glucan; 2-hexyl-3-methylmaleic anhydride can be used to esterify —CO—C(CH₂CH₂CH₂CH₂CH₂CH₃)═C(CH₃)—COOH and/or —CO—C(CH₃)═C(CH₂CH₂CH₂CH₂CH₂CH₃)—COOH as a first group to poly alpha-1,3-glucan; itaconic anhydride can be used to esterify —CO—CH₂—C(CH₂)—COOH and/or —CO—C(CH₂)—CH₂—COOH as a first group to poly alpha-1,3-glucan; 2-nonen-1-yl succinic anhydride can be used to esterify —CO—CH₂—CH(CH₂CH═CHCH₂CH₂CH₂CH₂CH₃)—COOH and/or —CO—CH(CH₂CH═CHCH₂CH₂CH₂CH₂CH₃)—CH₂—COOH as a first group to poly alpha-1,3-glucan.

As disclosed in WO 2017/003808, each of these first groups comprising a —C$_x$— portion with at least one organic group branch can be derived by reacting the appropriate cyclic organic anhydride with poly alpha-1,3-glucan. An example of using 2-nonen-1-yl succinic anhydride is described above. Another illustrative example includes using methylmaleic anhydride to ester-derivatize poly alpha- 1,3-glucan, where the resultant first group is —CO—CH=C(CH$_3$)—COOH or —CO—C(CH$_3$)=CH—COOH. Still another illustrative example includes using itaconic anhydride (2-methylenesuccinic anhydride) to ester-derivatize poly alpha-1,3-glucan, where the resultant first group is —CO—CH$_2$—C(CH$_2$)—COOH or —CO—C(CH$_2$)—CH$_2$—COOH. Thus, a cyclic organic anhydride comprising a —C$_x$— portion represented in any of the above-listed first groups (where the corresponding —C$_x$— portion of a cyclic organic anhydride is that portion linking each side of the anhydride group [—CO—O—CO—] together to form a cycle) can be reacted with poly alpha-1,3-glucan to produce an ester thereof having the corresponding first group (—CO—C$_x$—COOH).

Those skilled in the art would understand that in certain embodiments herein, a poly alpha-1,3-glucan ester compound can be in an anionic form under aqueous conditions. This anionic behavior is due to the presence of a carboxyl group (COOH) in the esterified first group (—CO—C$_x$—COOH). Carboxyl (COOH) groups of a poly alpha-1,3-glucan ester compound herein can convert to carboxylate (COO$^-$) groups in aqueous conditions. These anionic groups can interact with salt cations such as potassium, sodium, or lithium cations, if present.

In one embodiment, a poly alpha-1,3-glucan ester compound represented by Structure 1 as disclosed herein comprises poly alpha-1,3-glucan succinate, poly alpha-1,3-glucan methylsuccinate, poly alpha-1,3-glucan 2-methylene succinate, poly alpha-1,3-glucan maleate, poly alpha-1,3-glucan methylmaleate, poly alpha-1,3-glucan dimethyl maleate, poly alpha-1,3-glucan 2-ethyl-3-methyl maleate, poly alpha-1,3-glucan 2-hexyl-3-methyl maleate, poly alpha-1,3-glucan 2-ethyl-3-methylglutaconate, poly alpha-1,3-glucan 2-nonen-1-yl-succinate, poly alpha-1,3-glucan 2-octene-1-yl succinate, or mixtures thereof. In another embodiment, the poly alpha-1,3-glucan ester compound represented by Structure 1 comprises poly alpha-1,3-glucan succinate.

The term "degree of substitution" (DoS) as used herein refers to the average number of hydroxyl groups substituted in each monomeric unit (glucose) of a derivatized poly alpha-1,3-glucan compound. Poly alpha-1,3-glucan ester compounds represented by Structure 1 useful in the latex compositions disclosed herein have a degree of substitution (DoS) with one or more first groups (—CO—C$_x$—COOH) of about 0.001 to about 3. In one embodiment, the poly alpha-1,3-glucan ester compounds have a DoS in the range of about 0.001 to about 0.3, or from about 0.001 to about 0.2. Alternatively, the DoS of a poly alpha-1,3-glucan ester compound can be at least about 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. It would be understood by those skilled in the art that, since a poly alpha-1,3-glucan ester compound has a degree of substitution between about 0.001 to about 3, the R groups of the compound cannot only be hydrogen. With appropriate choice of the first group comprising —CO—C$_x$—COOH and the degree of substitution of the glucan polymer, the alpha-1,3-glucan ester compound can be insoluble in the aqueous solution of the latex composition. The structure, molecular weight and DoS of a poly alpha-1,3-glucan ester product can be confirmed using various physiochemical analyses known in the art such as NMR spectroscopy and size exclusion chromatography (SEC).

A poly alpha-1,3-glucan ester compound herein can have at least about 50%, 60%, 70%, 80%, 90%, 95%, 96%, 97%, 98%, 99%, or 100% (or any integer between 50% and 100%) glycosidic linkages that are alpha-1,3. In such embodiments, accordingly, the poly alpha-1,3-glucan ester compound has less than about 50%, 40%, 30%, 20%, 10%, 5%, 4%, 3%, 2%, 1%, or 0% (or any integer value between 0% and 50%) of glycosidic linkages that are not alpha-1,3. A poly alpha-1,3-glucan ester compound preferably has at least about 98%, 99%, or 100% glycosidic linkages that are alpha-1,3.

The backbone of a poly alpha-1,3-glucan ester compound herein is preferably linear/unbranched. In certain embodiments, the compound has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points.

The formula of a poly alpha-1,3-glucan ester compound in certain embodiments can have an n value of at least 6. Alternatively, n can have a value of at least 10, 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 (or any integer between 10 and 4000), for example. The value of n in still other examples can be in a range of 25-250, 50-250, 75-250, 100-250, 150-250, 200-250, 25-200, 50-200, 75-200, 100-200, 150-200, 25-150, 50-150, 75-150, 100-150, 25-100, 50-100, 75-100, 25-75, 50-75, or 25-50.

The molecular weight of a poly alpha-1,3-glucan ester compound disclosed herein can be measured as number-average molecular weight ($M_n$) or as weight-average molecular weight ($M_w$). Alternatively, molecular weight can be measured in Daltons or grams/mole. It may also be useful to refer to the DP$_w$ (weight average degree of polymerization) or DP$_n$ (number average degree of polymerization) of the poly alpha-1,3-glucan polymer component of the compound. The $M_n$ or $M_w$ of a poly alpha-1,3-glucan ester compound herein can be at least about 1000, for example. Alternatively, the $M_n$ or $M_w$ can be at least about 1000 to about 600000. Alternatively still, the $M_n$ or $M_w$ can be at least about 10000, 25000, 50000, 75000, 100000, 125000, 150000, 175000, 200000, 225000, 250000, 275000, or 300000 (or any integer between 10000 and 300000), for example.

In one embodiment, the latex composition comprises polysaccharide particles and a polymer dispersion or polymer emulsion dispersed in an aqueous solution, wherein the polysaccharide particles comprise a poly alpha-1,3-glucan ester compound comprising poly alpha-1,3-glucan succinate. In one embodiment, the polysaccharide particles comprise a poly alpha-1,3-glucan ester compound comprising poly alpha-1,3-glucan glutarate. In another embodiment, the polysaccharide particles comprise a poly alpha-1,3-glucan ester compound comprising poly alpha-1,3-glucan maleate. In an additional embodiment, the polysaccharide particles comprise a poly alpha-1,3-glucan ester compound comprising poly alpha-1,3-glucan alkenyl succinate. In a further embodiment, the polysaccharide particles comprise a poly alpha-1,3-glucan ester compound derived from modification of poly alpha-1,3-glucan with alkylketene dimer.

In an additional embodiment, the polysaccharide particles comprise a poly alpha-1,3-glucan ester compound represented by Structure 2:

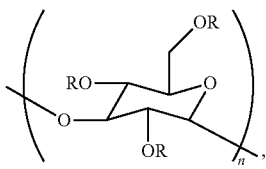

Structure 2 wherein
 (i) n is at least 6,
 (ii) each R is independently an H or an acyl group, and
 (iii) the compound has a degree of substitution of about 0.001 to about 3.0.

Suitable poly alpha-1,3-glucan ester compounds can include those as disclosed in U.S. Pat. No. 9,278,988, which also discloses methods of preparing such ester compounds, and which is incorporated herein by reference in its entirety. Mixtures of polysaccharide derivatives comprising ester compounds can also be used. Poly alpha-1,3-glucan mixed esters containing two or more types of an acyl group can also be used. Examples of such mixed esters are poly alpha-1,3-glucan acetate propionate (comprises acetyl and propionyl groups) and poly alpha-1,3-glucan acetate butyrate (comprises acetyl and butyryl groups).

Poly alpha-1,3-glucan ester compounds useful in the latex compositions disclosed herein and represented by Structure 2 can have the same range of percent glycosidic linkages, the same range of branch points as a percent of the glycosidic linkages in the polymer, the same range of n values, the same molecular weight $M_n$ ranges, the same molecular weight $M_w$ ranges, and the same $DP_w$ ranges as those of the poly alpha-1,3-glucan ester compounds represented by Structure I.

Poly alpha-1,3-glucan ester compounds represented by Structure 2 and useful in the latex compositions as disclosed herein can have a degree of substitution of about 0.001 to about 3. In one embodiment, the poly alpha-1,3-glucan ester compounds have a DoS in the range of about 0.001 to about 0.3, or from about 0.001 to about 0.2. Alternatively, the DoS of a poly alpha-1,3-glucan ester compound can be at least about 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. With appropriate choice of the acyl group(s) and the degree of substitution of the glucan polymer, the alpha-1,3-glucan ester compound can be insoluble in the aqueous solution of the latex composition. Poly alpha-1,3-glucan ester compounds useful in the latex composition disclosed herein and represented by Structure 2 include those wherein the acyl group comprises an acetyl group (—CO—CH$_3$), propionyl group (—CO—CH$_2$—CH$_3$), butyryl group (—CO—CH$_2$—CH$_2$—CH$_3$), pentanoyl group (—CO—CH$_2$—CH$_2$—CH$_2$—CH$_3$), hexanoyl group (—CO—CH$_2$—CH$_2$—CH$_2$—CH$_2$—CH$_3$), heptanoyl group (—CO—CH$_2$—CH$_2$—CH$_2$—CH$_2$—CH$_2$—CH$_3$), or octanoyl group (—CO—CH$_2$—CH$_2$—CH$_2$—CH$_2$—CH$_2$—CH$_2$—CH$_3$), for example. It is contemplated that suitable poly alpha-1,3-glucan ester compounds might also include those having longer chain ester groups, for example palmitate or lauryl ester groups. The carbonyl group (—CO—) of the acyl group is ester-linked to carbon 2, 4, or 6 of a glucose monomeric unit of a poly alpha-1,3-glucan ester compound.

In another embodiment, the polysaccharide particles comprise a poly alpha-1,3-glucan ether compound represented by Structure 3:

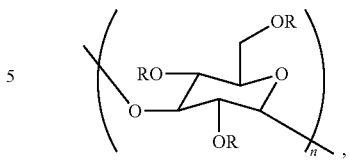

Structure 3 wherein
 (A) n is at least 6,
 (B) each R is independently an H or an organic group, and
 (C) the compound has a degree of substitution of about 0.001 to about 3.0.

Mixtures of polysaccharide derivatives comprising ether compounds can also be used. Poly alpha-1,3-glucan ether compounds wherein n is at least 800, each R is independently an H or an organic group, and the ether compound has a degree of substitution of about 0.05 to about 3.0, and methods to prepare such ether compounds, are disclosed in U.S. Published Patent Application No. 2014/0179913 A1 (now U.S. Pat. No. 9,139,718), which is incorporated by reference herein in its entirety. Poly alpha-1,3-glucan ether compounds represented by Structure 3 and having a DoS of about 0.001 to about 0.2, or about 0.2 to about 3, can be prepared by adjusting the ratio of glucan and etherification agent.

The degree of substitution (DoS) of a poly alpha-1,3-glucan ether compound disclosed herein can alternatively be about 0.2 to about 2.0. Alternatively still, the DoS can be at least about 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. It would be understood by those skilled in the art that since a poly alpha-1,3-glucan ether compound has a degree of substitution between about 0.05 to about 3.0, and by virtue of being an ether, the R groups of the compound cannot only be hydrogen.

The percentage of glycosidic linkages between the glucose monomer units of poly alpha-1,3-glucan ether compounds herein that are alpha-1,3 is at least about 50%, 60%, 70%, 80%, 90%, 95%, 96%, 97%, 98%, 99%, or 100% (or any integer between 50% and 100%). In such embodiments, accordingly, the compound has less than about 50%, 40%, 30%, 20%, 10%, 5%, 4%, 3%, 2%, 1%, or 0% (or any integer value between 0% and 50%) of glycosidic linkages that are not alpha-1,3.

The backbone of a poly alpha-1,3-glucan ether compound is preferably linear/unbranched. In certain embodiments, the compound has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points.

The formula of a poly alpha-1,3-glucan ether compound in certain embodiments can have an n value of at least 6. Alternatively, n can have a value of at least 25, 50, 75, 100, 150, 200, 250, 300, 350, 400, 450, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 (or any integer between 25 and 4000), for example. The value of n in still other examples can be in a range of 25-250, 50-250, 75-250, 100-250, 150-250, 200-250, 25-200, 50-200, 75-200, 100-200, 150-200, 25-150, 50-150, 75-150, 100-150, 25-100, 50-100, 75-100, 25-75, 50-75, or 25-50.

The molecular weight of a poly alpha-1,3-glucan ether compound can be measured as number-average molecular weight ($M_n$) or as weight-average molecular weight ($M_w$). Alternatively, molecular weight can be measured in Daltons or grams/mole. It may also be useful to refer to the $DP_w$ (weight average degree of polymerization) or $DP_n$ (number average degree of polymerization) of the poly alpha-1,3-glucan polymer component of the compound.

The $M_n$ or $M_w$ of a poly alpha-1,3-glucan ether compound may be at least about 1000. Alternatively, the $M_n$ or $M_w$ can be at least about 1000 to about 600000. Alternatively still, the $M_n$ or $M_w$ can be at least about 2000, 3000, 4000, 5000, 6000, 7000, 8000, 9000, 10000, 15000, 20000, 25000, 30000, 35000, 40000, 45000, 50000, 75000, 100000, 150000, 200000, 250000, 300000, 350000, 400000, 450000, 500000, 550000, or 600000 (or any integer between 2000 and 600000), for example.

Each R group in the formula of the poly alpha-1,3-glucan ether compound can independently be an H or an organic group. An organic group may be an alkyl group such as a methyl, ethyl, propyl, butyl, pentyl, hexyl, heptyl, octyl, nonyl, or decyl group, for example.

Alternatively, an organic group may be a substituted alkyl group in which there is a substitution on one or more carbons of the alkyl group. The substitution(s) may be one or more hydroxyl, aldehyde, ketone, and/or carboxyl groups. For example, a substituted alkyl group may be a hydroxy alkyl group, dihydroxy alkyl group, or carboxy alkyl group.

Examples of suitable hydroxy alkyl groups are hydroxymethyl (—CH$_2$OH), hydroxyethyl (e.g., —CH$_2$CH$_2$OH, —CH(OH)CH$_3$), hydroxypropyl (e.g., —CH$_2$CH$_2$CH$_2$OH, —CH$_2$CH(OH)CH$_3$, —CH(OH)CH$_2$CH$_3$), hydroxybutyl and hydroxypentyl groups. Other examples include dihydroxy alkyl groups (diols) such as dihydroxymethyl, dihydroxyethyl (e.g., —CH(OH)CH$_2$OH), dihydroxypropyl (e.g., —CH$_2$CH(OH)CH$_2$OH, —CH(OH)CH(OH)CH$_3$), dihydroxybutyl and dihydroxypentyl groups.

Examples of suitable carboxy alkyl groups are carboxymethyl (—CH$_2$COOH), carboxyethyl (e.g., —CH$_2$CH$_2$COOH, —CH(COOH)CH$_3$), carboxypropyl (e.g., —CH$_2$CH$_2$CH$_2$COOH, —CH$_2$CH(COOH)CH$_3$, —CH(COOH)CH$_2$CH$_3$), carboxybutyl and carboxypentyl groups.

Alternatively still, one or more carbons of an alkyl group can have a substitution(s) with another alkyl group. Examples of such substituent alkyl groups are methyl, ethyl and propyl groups. To illustrate, an R group can be —CH(CH$_3$)CH$_2$CH$_3$ or —CH$_2$CH(CH$_3$)CH$_3$, for example, which are both propyl groups having a methyl substitution.

As should be clear from the above examples of various substituted alkyl groups, a substitution (e.g., hydroxy or carboxy group) on an alkyl group in certain embodiments may be bonded to the terminal carbon atom of the alkyl group, where the terminal carbon group is opposite the terminus that is in ether linkage to the glucose group in the above formula. An example of this terminal substitution is the hydroxypropyl group —CH$_2$CH$_2$CH$_2$OH. Alternatively, a substitution may be on an internal carbon atom of an alkyl group. An example on an internal substitution is the hydroxypropyl group —CH$_2$CH(OH)CH$_3$. An alkyl group can have one or more substitutions, which may be the same (e.g., two hydroxyl groups [dihydroxy]) or different (e.g., a hydroxyl group and a carboxyl group).

Poly alpha-1,3-glucan ether compounds in certain embodiments may contain one type of organic group. For example, one or more R groups ether-linked to the glucose group in the above formula may be a methyl group; the R groups in this particular example would thus independently be hydrogen and methyl groups. Certain embodiments of poly alpha-1,3-glucan ether compounds containing only one type of organic group do not have a carboxy alkyl group (e.g., carboxymethyl group) as the organic group.

Alternatively, poly alpha-1,3-glucan ether compounds can contain two or more different types of organic groups. Examples of such compounds contain (i) two different alkyl groups as R groups, (ii) an alkyl group and a hydroxy alkyl group as R groups (alkyl hydroxyalkyl poly alpha-1,3-glucan, generically speaking), (iii) an alkyl group and a carboxy alkyl group as R groups (alkyl carboxyalkyl poly alpha-1,3-glucan, generically speaking), (iv) a hydroxy alkyl group and a carboxy alkyl group as R groups (hydroxyalkyl carboxyalkyl poly alpha-1,3-glucan, generically speaking), (v) two different hydroxy alkyl groups as R groups, or (vi) two different carboxy alkyl groups as R groups. Specific non-limiting examples of such compounds include ethyl hydroxyethyl poly alpha-1,3-glucan (i.e., where R groups are independently H, ethyl, or hydroxyethyl), hydroxyalkyl methyl poly alpha-1,3-glucan (i.e., where R groups are independently H, hydroxyalkyl, or methyl), carboxymethyl hydroxyethyl poly alpha-1,3-glucan (i.e., where R groups are independently H, carboxymethyl, or hydroxyethyl), and carboxymethyl hydroxypropyl poly alpha-1,3-glucan (i.e., where R groups are independently H, carboxymethyl, or hydroxypropyl). Certain embodiments of poly alpha-1,3-glucan ether compounds containing two or more different types of organic groups do not have a carboxy alkyl group (e.g., carboxymethyl group) as one of the organic groups.

In one embodiment, the latex composition comprises polysaccharide particles and a polymer dispersion or polymer emulsion dispersed in an aqueous solution, and the polysaccharide particles comprise a poly alpha-1,3-glucan ether compound wherein at least one organic group comprises a carboxy alkyl group. In one embodiment, the organic group comprises a carboxymethyl group. In another embodiment, the organic group comprises a carboxyethyl group. In another embodiment, the organic group comprises a carboxypropyl group. In a further embodiment, at least one organic group comprises an alkyl group. In one embodiment, the organic group is a methyl group. In another embodiment, the organic group is an ethyl group. In an additional embodiment, the organic group is a propyl group.

In certain embodiments, the organic group can be a positively charged organic group, and each R group in the poly alpha-1,3-glucan ether represented by Structure 3 can independently be an H or a positively charged organic group. In these embodiments, the polysaccharide comprises a poly alpha-1,3-glucan ether compound represented by Structure 4:

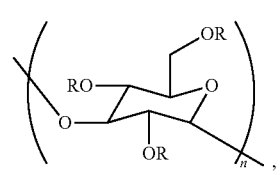

Structure 4 wherein
(A) n is at least 6,
(B) each R is independently an H or a positively charged organic group, and (C) the compound has a degree of substitution of about 0.001 to about 3.0.

Compositions comprising such alpha-1,3-glucan ether compounds and methods of preparing them are disclosed in published patent application WO 2015/095358, which is herein incorporated by reference in its entirety. Poly alpha-1,3-glucan ether compounds represented by Structure 4 and having a DoS of about 0.001 to about 3 can be prepared as described in WO 2015/095358, with the ratio of glucan and etherification agent adjusted to achieve the desired DoS value, as would be understood by one of ordinary skill in the art. With appropriate choice of the positively charged organic group and the degree of substitution of the glucan polymer, the alpha-1,3-glucan ether compound can be insoluble or water soluble under certain conditions.

A positively charged organic group comprises a chain of one or more carbons having one or more hydrogens substituted with another atom or functional group, where one or more of the substitutions is with a positively charged group. In one embodiment, at least one positively charged organic group comprises a substituted ammonium group. In another embodiment, at least one positively charged organic group comprises a trimethylammonium group. In one embodiment, the positively charged organic group can be a quaternary ammonium group. In yet another embodiment, at least one positively charged organic group comprises an alkyl group or hydroxy alkyl group. The compound in this embodiment may contain one type of positively charged organic group, or two or more types of positively charged organic group. At least one positively charged organic group can be a quaternary ammonium hydroxypropyl group, for example.

A "quaternary ammonium poly alpha-1,3-glucan ether compound" herein can comprise a positively charged organic group having a trialkylammonium group, for example. An example of a quaternary ammonium poly alpha-1,3-glucan ether compound can be represented in shorthand as trialkylammonium poly alpha-1,3-glucan ether (e.g., trimethyl-, triethyl-, tripropyl-, tributyl-, tripentyl-, trihexyl-, triheptyl-, trioctyl-, trinonyl- or tridecyl-ammonium poly alpha-1,3-glucan ether). It would be understood that a fourth member implied by the term "quaternary" is the chain of one or more carbons of the positively charged organic group that is ether-linked to a glucose monomer of poly alpha-1,3-glucan.

A positively charged group may be a substituted ammonium group, for example. Examples of substituted ammonium groups are primary, secondary, tertiary and quaternary ammonium groups. The terms "substituted ammonium group", "substituted ammonium ion" and "substituted ammonium cation" are used interchangeably herein. A substituted ammonium group herein comprises Structure 6:

Structure 6

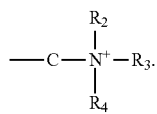

$R_2$, $R_3$ and $R_4$ in Structure 6 each independently represent a hydrogen atom or an alkyl, aryl, cycloalkyl, aralkyl, or alkaryl group. The carbon atom (C) in Structure 6 is part of the chain of one or more carbons ("carbon chain") of the positively charged organic group. The carbon atom is either directly ether-linked to a glucose monomer of poly alpha-1,3-glucan, or is part of a chain of two or more carbon atoms ether-linked to a glucose monomer of poly alpha-1,3-glucan. The carbon atom in Structure 6 can be —$CH_2$—, —CH— (where a H is substituted with another group such as a hydroxy group), or —C— (where both H's are substituted).

The nitrogen atom in a substituted ammonium group represented by Structure 6 is bonded to a chain of one or more carbons as comprised in a positively charged organic group. This chain of one or more carbons ("carbon chain") is ether-linked to a glucose monomer of poly alpha-1,3-glucan, and may have one or more substitutions in addition to the substitution with the nitrogen atom of the substituted ammonium group. There can be 1, 2, 3, 4, 5, 6, 7, 8, 9 or 10 carbons, for example, in a carbon chain herein.

Examples of a carbon chain of a positively charged organic group that do not have a substitution in addition to the substitution with a positively charged group include —$CH_2$—, —$CH_2CH_2$—, —$CH_2CH_2CH_2$—, —$CH_2CH_2CH_2CH_2$— and —$CH_2CH_2CH_2CH_2CH_2$—. In each of these examples, the first carbon atom of the chain is ether-linked to a glucose monomer of poly alpha-1,3-glucan, and the last carbon atom of the chain is linked to a positively charged group. Where the positively charged group is a substituted ammonium group, the last carbon atom of the chain in each of these examples is represented by the C in Structure 6.

Where a carbon chain of a positively charged organic group has a substitution in addition to a substitution with a positively charged group, such additional substitution may be with one or more hydroxyl groups, oxygen atoms (thereby forming an aldehyde or ketone group), alkyl groups (e.g., methyl, ethyl, propyl, butyl), and/or additional positively charged groups. A positively charged group is typically bonded to the terminal carbon atom of the carbon chain.

Examples of a carbon chain having one or more substitutions with a hydroxyl group include hydroxyalkyl (e.g., hydroxyethyl, hydroxypropyl, hydroxybutyl, hydroxypentyl) groups and dihydroxyalkyl (e.g., dihydroxyethyl, dihydroxypropyl, dihydroxybutyl, dihydroxypentyl) groups. Examples of hydroxyalkyl and dihydroxyalkyl (diol) carbon chains include —CH(OH)—, —CH(OH)$CH_2$—, —C(OH)$_2$$CH_2$—, —$CH_2$CH(OH)$CH_2$—, —CH(OH)$CH_2CH_2$—, —CH(OH)CH(OH)$CH_2$—, —$CH_2CH_2$CH(OH)$CH_2$—, —$CH_2$CH(OH)$CH_2CH_2$—, —CH(OH)$CH_2CH_2CH_2$—, —$CH_2$CH(OH)CH(OH)$CH_2$—, —CH(OH)CH(OH)$CH_2CH_2$— and —CH(OH)$CH_2$CH(OH)$CH_2$—. In each of these examples, the first carbon atom of the chain is ether-linked to a glucose monomer of poly alpha-1,3-glucan, and the last carbon atom of the chain is linked to a positively charged group. Where the positively charged group is a substituted ammonium group, the last carbon atom of the chain in each of these examples is represented by the C in Structure 6.

Examples of a carbon chain having one or more substitutions with an alkyl group include chains with one or more substituent methyl, ethyl and/or propyl groups. Examples of methylalkyl groups include —CH($CH_3$)$CH_2CH_2$— and —$CH_2$CH($CH_3$)$CH_2$—, which are both propyl groups having a methyl substitution. In each of these examples, the first carbon atom of the chain is ether-linked to a glucose monomer of poly alpha-1,3-glucan, and the last carbon atom of the chain is linked to a positively charged group. Where the positively charged group is a substituted ammonium group, the last carbon atom of the chain in each of these examples is represented by the C in Structure 6.

Poly alpha-1,3-glucan ether compounds in certain embodiments may contain one type of positively charged organic group as an R group. For example, one or more positively charged organic groups ether-linked to the glucose monomer of poly alpha-1,3-glucan may be trimethylammonium hydroxypropyl groups; the R groups in this particular example would thus independently be hydrogen and trimethylammonium hydroxypropyl groups. Alternatively, poly alpha-1,3-glucan ether compounds disclosed herein can contain two or more different types of positively charged organic groups as R groups.

In one embodiment, the latex composition comprises polysaccharide particles and a polymer dispersion or polymer emulsion dispersed in an aqueous solution, and the polysaccharide particles comprise a poly alpha-1,3-glucan ether compound wherein at least one positively charged organic group comprises a substituted ammonium group. In one embodiment, the positively charged organic group comprises a trimethylammonium group. In another embodiment, the positively charged organic group is a quaternary ammonium group. In a further embodiment, at least one positively charged organic group comprises an alkyl group or hydroxy alkyl group. In yet another embodiment, at least one positively charged organic group is a quaternary ammonium hydroxypropyl group.

The polysaccharide particles in the latex composition can be present any useful amount, for example in an amount from about 0.01 weight percent (wt %) polysaccharide solids to about 75 wt % polysaccharide solids, based on the total weight of the polysaccharide and polymer solids. In some embodiments, the polysaccharide particles are present in the latex composition in an amount from about 0.01 wt % polysaccharide solids to about 5 wt % polysaccharide solids, or from about 5 wt % polysaccharide solids to about 20 wt % polysaccharide solids, for from about 20 wt % polysaccharide solids to about 50 wt % polysaccharide solids, or from about 50 wt % polysaccharide solids to about 75 wt % polysaccharide solids, based on the total weight of the polysaccharide solids and the polymer solids. In some embodiments, the polysaccharide particles can be present in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 15, 20, 25, 30, 40, 45, 50, 55, 60, 65, 70, or 75 wt % polysaccharide solids (or any value between 0.01 wt % and 75 wt %), based on the total weight of the polysaccharide solids and the polymer solids.

The latex compositions comprise a polymer dispersion or polymer emulsion dispersed in an aqueous solution. The polymer dispersion or emulsion can comprise a polymer polymerized from at least one ethylenically unsaturated monomer; polyurethane; epoxy, a rubber elastomer; or a combination thereof.

In one embodiment, the polymer dispersion or polymer emulsion comprises a polymer polymerized from one or more copolymerizable monoethylenically unsaturated monomers. In one embodiment, the polymer dispersion or emulsion comprises a polymer polymerized from one or more copolymerizable monoethylenically unsaturated monomers in water. In one embodiment, the one or more monoethylenically unsaturated monomer comprises vinyl monomers, acrylic monomers, allylic monomers, acrylamide monomers, monocarboxylic unsaturated acids, dicarboxylic unsaturated acids, or a mixture thereof. In one embodiment, the polymer particles comprise a polymer polymerized from vinyl monomers, acrylic monomers, or a mixture thereof. In another embodiment, the polymer dispersion or emulsion comprises a polymer polymerized from vinyl monomers and acrylic monomers. In a further embodiment, the polymer dispersion or emulsion comprises a polymer polymerized from vinyl copolymers and acrylic monomers. In yet another embodiment, the polymer dispersion or emulsion comprises a polymer polymerized from vinyl monomers and acrylic copolymers. In a further embodiment, the polymer dispersion or emulsion comprises a polymer polymerized from vinyl copolymers and acrylic copolymers.

Vinyl monomers suitable for use in preparing the polymer dispersion or polymer emulsion of the latex compositions disclosed herein include any compounds having vinyl functionality, i.e. ethylenic unsaturation, exclusive of compounds having acrylic functionality, e.g., acrylic acid, methacrylic acid, esters of such acids, acrylonitrile and acrylamides. In one embodiment, the vinyl monomers are selected from the group consisting of vinyl esters, vinyl aromatic hydrocarbons, vinyl aliphatic hydrocarbons, vinyl alkyl ethers, and mixtures thereof.

Suitable vinyl monomers can include vinyl esters such as, for example, vinyl acetate, vinyl propionate, vinyl laurate, vinyl pivalate, vinyl nonanoate, vinyl decanoate, vinyl neodecanoate, vinyl butyrates, vinyl benzoates, vinyl isopropyl acetates, and similar vinyl esters; vinyl aromatic hydrocarbons such as, for example, styrene, methyl styrenes, and similar lower alkyl styrenes, chlorostyrene, vinyl toluene, vinyl naphthalene, and divinyl benzene; vinyl aliphatic hydrocarbon monomers such as, for example, vinyl chloride and vinylidene chloride as well as alpha olefins such as, for example, ethylene, propylene, isobutylene, as well as conjugated dienes such as 1,3-butadiene, methyl-2-butadiene, 1,3-piperylene, 2,3-dimethyl butadiene, isoprene, cyclohexene, cyclopentadiene, and dicyclopentadiene; and vinyl alkyl ethers such as, for example, methyl vinyl ether, isopropyl vinyl ether, n-butyl vinyl ether, and isobutyl vinyl ether.

In one embodiment, the polymer dispersion or polymer emulsion of the latex composition comprises a vinyl acetate-ethylene copolymer dispersion. In another embodiment, the polymer dispersion or polymer emulsion comprises carboxylated vinyl acetate-ethylene copolymer dispersion. In yet another embodiment, the polymer dispersion or polymer emulsion comprises polyvinyl acetate.

The acrylic monomers suitable for use in preparing the polymer dispersion or emulsion of the latex compositions disclosed herein include any compounds having acrylic functionality. In one embodiment, the acrylic monomers are selected from the group consisting of alkyl acrylates, alkyl methacrylates, acrylate acids, and methacrylate acids as well as aromatic derivatives of acrylic and methacrylic acid, acrylamides, and acrylonitrile. Typically, the alkyl acrylate and methacrylic monomers (also referred to as alkyl esters of acrylic or methacrylic acid) have an alkyl ester portion containing from 1 to about 18 carbon atoms per molecule, or from 1 to about 8 carbon atoms per molecule.

Suitable acrylic monomers include, for example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecyl acrylate and methacrylate, benzyl acrylate and methacrylate, isobornyl acrylate and methacrylate, neopentyl acrylate and methacrylate, and 1-adamantyl methacrylate. If acid functionality is desired, acids such as acrylic acid or methacrylic acid can also be used.

In addition to the specific monomers listed above, other monomers such as allylic monomers, or monomers which impart wet adhesion, such as monomers having tertiary amine, ethylene ureide, or N-heterocyclic groups can be used in place of, or in addition to, the specifically listed monomers in the preparation of the polymer dispersions or polymer emulsions. Representative wet adhesion promoting monomers include methacrylamidoetyyl ethylene urea, dimethylaminoethyl methacrylate, vinyl imidazole, and 2-ethyleneuriedo-ethyl methacrylate. The amount of such other monomers id dependent on the particular monomers and their intended function, which can be determined by those of skill in the art.

In one embodiment, the polymer dispersion or polymer emulsion may comprise a "single stage" polymer which is typically obtained by admixing selected polymerizable monomers in a single reaction mixture. In another embodiment, the polymer dispersion or polymer emulsion may comprise a polymer obtained by admixing the monomers in multiple stages having different monomer compositions or concentrations at various stages of the addition. In a further embodiment, the polymeric dispersion may comprise a "two-stage" polymer where the final polymer is essentially formed in the presence of another, preformed polymer.

Any of the known free-radical emulsion polymerization techniques can be used to formulate latex polymer, for example as disclosed in U.S. Pat. No. 5,486,576, which is incorporated herein by reference in its entirety. Such procedures include for example, single feed, core-shell, and inverted core-shell procedures which produce homogeneous or structured particles. For some applications it is useful to use polymeric particles which do not contain any self-crosslinking or oxidation curing functionality.

Processing of the polymer dispersion or polymer emulsion to prepare a small particle size or large particle latex can be controlled by methods known in the art. Typically, smaller particle size polymer dispersions and polymer emulsions are prepared by using relatively greater levels of surfactant, especially early in the polymerization process to obtain smaller micelles. The surfactant level may be in the range of about 3% to about 7% of the weight of the monomers to prepare a small particle size polymer dispersion or polymer emulsion. To prepare a larger particle size polymer dispersion or polymer emulsion, the surfactant level may be in the range of about 0.5 to about 2.5% of the total weight of the monomers.

In another embodiment, the polymer dispersion or polymer emulsion comprises polyurethane. Polyurethane polymers comprising polysaccharides are disclosed in published patent application WO 2018/017789. Polyurethane dispersions can be prepared by methods known in the art, for example as disclosed in published patent application US 2016/0347978, which is incorporated by reference herein in its entirety, and comprise the reaction product of one or more polyisocyanates with one or more polyols. Useful polyols can include polycarbonate polyols, polyester polys, polyether polyols, or a combination thereof. Polyurethane dispersions or emulsions can contain more than one polyurethane dispersion. For example, one or more polyester polyurethane dispersions or emulsions can be combined with one or more polycarbonate polyurethane dispersions or emulsions. Polycarbonate polyurethane dispersions can be formed as the reaction product of a polyol, for example 1,3-propanediol, 1,4-butanediol, 1,6-hexanediol, diethylene glycol, or tetraethylene glycol, with diaryl carbonates such as diphenyl carbonate or phosgene.

The at least one polyisocyanate can be any of the known polyisocyanates. For example, the polyisocyanate can be an aliphatic polyisocyanate, an aromatic polyisocyanate or a polyisocyanate that has both aromatic and aliphatic groups. Examples of polyisocyanates can include, for example, 1,6-hexamethylene diisocyanate, isophorone diisocyanate, 2,4-toluene diisocyanate, 2,6-toluene diisocyanate, mixtures of 2,4- and 2,6-toluene diisocyanate, bis(4-isocyanatocyclohexyl) methane, 1,3-bis(1-isocyanato-1-methylethyl)benzene, bis(4-isocyanatophenyl)methane, 2,4'-diphenylmethane diisocyanate, 2,2'-diphenylmethane diisocyanate, 2,4-diisocyanatotoluene, bis(3-isocyanatophenyl)methane, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, hexahydrotoluene diisocyanate, 1,5-naphthalene diisocyanate, 1-methoxy-2,4-phenylene diisocyanate, 4,4'-biphenylmethane diisocyanate, 4,4'-biphenylene diisocyanate, 3,3'-dimethyl-4,4'-diphenylmethane diisocyanate, 3,3'-4,4'-diphenylmethane diisocyanate, 3,3'-dimethyldiphenylmethane-4,4'-diisocyanate, or a combination thereof. Also useful are homopolymers of polyisocyanates, for example, polyisocyanates comprising allophanate, biuret, isocyanurate, iminooxadiazinedione, or carbodiimide groups.

The at least one polyol can be any polyol comprising two or more hydroxyl groups, for example, a $C_2$ to $C_{12}$ alkane diol, ethylene glycol, 1,2-propylene glycol, 1,3-propylene glycol, isomers of butane diol, pentane diol, hexane diol, heptane diol, octane diol, nonane diol, decane diol, undecane diol, dodecane diol, 2-methyl-1,3-propane diol, 2,2-dimethyl-1,3-propane diol (neopentyl glycol), 1,4-bis(hydroxymethyl)cyclohexane, 1,2,3-propane triol (glycerol), 2-hydroxymethyl-2-methyl-1,3-propanol (trimethylolethane), 2-ethyl-2-hydroxymethyl-1,3-propanediol (trimethylolpropane), 2,2-bis(hydroxymethyl)-1,3-propane diol (pentaerythritol); 1,4,6-octanetriol; chloropentanediol; glycerol monoalkyl ether; glycerol monoethyl ether; diethylene glycol; 1,3,6-hexanetriol; 2-methylpropanediol; 2,2,4-trimethyl-1,3-pentanediol, cyclohexanedimethanol, polymeric polyols, for example, polyether polyols, polyester polyols or combinations thereof. In some embodiments, the polyol can be poly(oxytetramethylene) glycol, polyethylene glycol, poly 1,3-propane diol. Polyester polyols can also be used. Polyester polyols are well-known in the art and are typically produced by the transesterification of aliphatic diacids with aliphatic diols. Suitable aliphatic diacids can include, for example, $C_3$ to $C_{10}$ diacids, malonic acid, succinic acid, glutaric acid, adipic acid, pimelic acid, suberic acid, azelic acid, sebacic acid. In some embodiments, aromatic and/or unsaturated diacids can also be used to form the polyester polyols. While the diacids are specifically named, it is common to use esters or dihalides of the diacids in order to form the desired polyester polyols. Any of the above mentioned polyols, especially diols can be used to form the polyester polyols. Combinations of any of the above polyols can also be used.

In one embodiment, the polyurethane dispersions or polymer emulsions may be linear (unbranched). In another embodiment, the polyurethane dispersions or polymer emulsions may have a degree of branching between about 1% to about 10%, for example from about 1% to about 7%, or from about 1% to about 5%, or for example from about 2% to about 4%. Branching may be achieved by selective incorporation and use of one or more branching agents, for example trimethylolethane.

In an additional embodiment, the polymer dispersion or polymer emulsion comprises epoxy. Epoxy resins, also known as polyepoxides, are a class of reactive prepolymers and polymers which contain epoxide groups. Epoxy resins may be reacted (cross-linked) either with themselves through catalytic homopolymerization, or with a wide range of co-reactants including polyfunctional amines, acids (and acid anhydrides), phenols, alcohols, and thiols. These co-reactants are often referred to as hardeners or curatives, and the cross-linking reaction is commonly referred to as curing. Reaction of polyepoxides with themselves or with polyfunctional hardeners forms a thermosetting polymer, often with high mechanical properties, temperature and chemical resistance. Epoxides useful in the compositions disclosed herein include bisphenol A epoxy resin, bisphenol F epoxy resin, Novolac epoxy resin, aliphatic epoxy resin, and glycidylamine epoxy resin. Such epoxy resins can be obtained commercially or prepared using methods known in the art. In one embodiment, the epoxy system is composed of pre-dispersed waterborne epoxy resins and a waterborne curing agent. In another embodiment, the epoxy system is composed of neat liquid epoxy and a waterborne curing agent. In an additional embodiment, the epoxy system is composed of a hybrid of neat epoxy and pre-dispersed waterborne epoxy with waterborne curing agent.

In a further embodiment, the polymer dispersion or polymer emulsion comprises a rubber elastomer. In one embodiment, the rubber elastomer can include one or more diene-based sulfur-vulcanizable elastomers having a glass transition temperature (Tg) below −30° C., as determined, for example, by dynamic mechanical analysis.

In another embodiment, the rubber elastomer can be any suitable elastomer or combination of elastomers such as, for example, natural rubber, synthetic polyisoprene, polybutadiene rubber, styrene/butadiene copolymer rubber (prepared by aqueous emulsion or organic solvent polymerization), ethylene propylene diene monomer rubber, hydrogenated nitrile butadiene rubber, neoprene, styrene/isoprene/butadiene terpolymer rubber, butadiene/acrylonitrile rubber, polyisoprene rubber, isoprene/butadiene copolymer rubber, nitrile rubber, ethylene-acrylic rubber, butyl and halobutyl rubber, chlorosulfonated polyethylene, fluoroelastomer, hydrocarbon rubber, polybutadiene, silicone rubber, and combinations thereof. As used herein, the term "neoprene" is synonymous with polychloroprene and refers to synthetic rubber produced by the polymerization of chloroprene, including sulfur-modified chloroprene. In one embodiment, the rubber component comprises natural rubber, synthetic polyisoprene, styrene butadiene copolymer rubber, ethylene propylene diene monomer rubber, hydrogenated nitrile rubber, polybutadiene, or neoprene. In one embodiment, the rubber component comprises natural rubber. In one embodiment, the rubber component comprises styrene butadiene copolymer rubber. In one embodiment, the rubber component comprises ethylene propylene diene monomer rubber. In one embodiment, the rubber component comprises hydrogenated nitrile butadiene rubber. In one embodiment, the rubber component comprises neoprene. In one embodiment, the rubber component comprises silicone rubber. Rubber elastomer dispersions can be obtained commercially or prepared by methods known in the art, for example as disclosed in U.S. Pat. No. 3,281,386 A.

In some embodiments, the rubber elastomer can comprise one or more fillers, for example silica, carbon black, or a mixture thereof. Optionally, the rubber elastomer can comprise at least one additive, for example an antioxidant, an antiozonant, a processing aid, a compatibilizer, a bonding agent, a tackifier, a curing agent, an accelerator, or a combination thereof. The polymer dispersion or polymer emulsion in the latex composition can have an average particle size in at least one dimension in the range from about 10 to about 2500 nm, for example in the range of about 40 nm to about 700 nm, or about 80 nm to about 400 nm, or about 40 nm to about 1000 nm, or about 80 nm to about 2000 nm, or about 80 nm to about 2500 nm. Particle size can be determined by methods known in the art.

The amount of polymer present in the latex composition can be any useful amount, for example in an amount from about 0.5 weight percent (wt %) polymer solids to about 90 wt % polymer solids, based on the total weight of the polysaccharide and polymer solids. In some embodiments, the polymer is present in the form of a polymer dispersion or polymer emulsion in the latex composition in an amount from about 0.5 wt % polymer solids to about 5 wt % polymer solids, or from about 5 wt % polymer solids to about 20 wt % polymer solids, for from about 5 wt % polymer solids to about 50 wt % polymer solids, or from about 5 wt % polymer solids to about 75 wt % polymer solids, based on the total weight of the polysaccharide solids and the polymer. In some embodiments, the polymer can be present in an amount of about 0.5, 1, 2, 3, 4, 5, 6, 7, 8, 9, 10, 15, 20, 25, 30, 40, 45, 50, 55, 60, 65, 70, 75, 80, 85, or 90 wt % polymer solids (or any value between 0.5 wt % and 90 wt %), based on the total weight of the polysaccharide solids and the polymer.

The latex compositions disclosed herein comprise polysaccharide particles and a polymer dispersion or polymer emulsion, and both the polysaccharide particles and the polymer dispersion or emulsion are dispersed in an aqueous solution. In one embodiment, the aqueous solution is water. In another embodiment, the aqueous solution further comprises an organic solvent. The organic solvent can be miscible with water or immiscible with water. Useful organic solvents can include acetone, methyl ethyl ketone, butyl acetate, tetrahydrofuran, methanol, ethanol, isopropanol, diethyl ether, glycerol ethers, hexane, toluene, dimethyl acetamide, dimethylformamide, and dimethyl sulfoxide. In one embodiment, the aqueous solution further comprises an organic solvent, and the organic solvent is methanol. In another embodiment, the aqueous solution further comprises an organic solvent, and the organic solvent is tetrahydrofuran. In a yet another embodiment, the aqueous solution further comprises an organic solvent, and the organic solvent is methanol.

In one embodiment, the latex compositions disclosed herein are essentially free from starch, hydroxyalkyl starch, or modified starch. In one embodiment, the latex composition is essentially free from cellulose or modified cellulose. As used herein, the phrase "essentially free from" means that the latex composition contains less than 1% by weight of the component, or less than 0.5% by weight or less than 0.1% by weight or less than 0.01% by weight of the component.

The latex compositions disclosed herein may further comprise one or more additives. Useful additives can include additives such as a dispersant, rheological aid, antifoam, foaming agent, adhesion promoter, flame retardant, bactericide, fungicide, preservative, optical brightener, pigment, filler, anti-settling agent, coalescing agent, humectant, buffer, colorant, viscosity modifier, antifreeze, surfactant, binder, crosslinking agent, anticorrosion agent, hardener, pH regulator, salt, thickener, plasticizer, stabilizer, extender, matting agent, or a combination thereof. Examples of useful pigments include titanium dioxide, calcium carbonate, diatomaceous earth, mica, hydrated aluminum oxide, barium sulfate, calcium silicate, clay, silica, talc, zinc oxide, aluminum silicate, nepheline syenite, and mixtures thereof.

In one embodiment, the latex composition comprises polysaccharide particles and a polymer dispersion or polymer emulsion dispersed in an aqueous solution, wherein the polysaccharide particles comprise poly alpha-1,3-glucan and the polymer dispersion or polymer emulsion comprise a polymer polymerized from vinyl monomers, acrylic monomers, or a mixture thereof. In one embodiment, the latex composition comprises polysaccharide particles and a polymer dispersion or polymer emulsion dispersed in an aqueous solution, wherein the polysaccharide particles comprise poly alpha-1,3-glucan and the polymer dispersion or polymer emulsion comprises polyurethane. In a further embodiment, the poly alpha-1,3-glucan particles are present at an amount in the range of from about 0.1 weight percent polysaccharide solids to about 3 weight percent polysaccharide solids, based on the total weight of polysaccharide and polymer solids.

In one embodiment, the latex composition comprises polysaccharide particles and a polymer dispersion or polymer emulsion dispersed in an aqueous solution, wherein the polysaccharide particles comprise poly alpha-1,3-glucan and the polymer dispersion or emulsion comprises polyurethane. In a further embodiment, the poly alpha-1,3-glucan particles are present at an amount in the range of from about 5 weight percent polysaccharide solids to about 35 weight percent polysaccharide solids, based on the total weight of polysaccharide and polymer solids.

In one embodiment, the latex composition comprises polysaccharide particles and a polymer dispersion or emulsion dispersed in an aqueous solution, wherein the polysaccharide particles comprise poly alpha-1,3-glucan and the polymer dispersion or emulsion comprises polyurethane. In a further embodiment, the poly alpha-1,3-glucan particles are present at an amount in the range of from about 70 weight percent polysaccharide solids to about 80 weight percent polysaccharide solids, based on the total weight of polysaccharide and polymer solids.

Also disclosed herein is a method of making a latex composition comprising polysaccharide particles and a polymer dispersion or emulsion dispersed in an aqueous solution, the method comprising the steps of:

a) providing polysaccharide particles;
b) providing a polymer dispersion or emulsion;
c) combining the polysaccharide particles and the polymer dispersion or emulsion in an aqueous solution; and
d) forming a dispersion by subjecting the combined particles to high shear dispersing.

The polysaccharide particles comprise at least one polysaccharide as disclosed herein above and can be provided as a solid or as a dispersion of polysaccharide particles in aqueous solution. The polymer comprises a polymer as disclosed herein above and can be provided as a solid or as a dispersion of polymer particles or a polymer emulsion in aqueous solution. In one embodiment, the polysaccharide particles or dispersion of polysaccharide particles can be can be charged into a mixer, optionally with an aqueous solution, and the polymer dispersion or polymer emulsion is then added slowly to the polysaccharide particles with sufficient mixing to provide good dispersion of the polysaccharide particles and the polymer in the aqueous solution, forming the latex composition. In another embodiment, the polymer dispersion or polymer emulsion can be charged into a mixer, and the polysaccharide particles or dispersion of polysaccharide particles are then added slowly to the polymer dispersion or emulsion with sufficient mixing to provide good dispersion of the polymer and the polysaccharide particles in the aqueous solution, forming the latex composition. The latex composition can be formed by subjecting the polysaccharide particles and the polymer dispersion or emulsion to high shear dispersing using methods known in the art.

The latex compositions disclosed herein can be useful in paint formulations, including primers. A primer is used as the first layer on a substrate to be coated, and provides adhesion between the substrate and subsequent paint or coating layers.

In one embodiment, a latex composition as disclosed herein can be used to prepare paint. Typically, paints may also comprise other common paint additives such as pigments, thickeners, dispersants, surfactants, anti-settling agents, biocides/preservatives, coalescing agents, plasticizers, stabilizers, viscosifiers, leveling aids, defoamers, anti-skinning agents, extenders, crosslinkers, corrosion inhibitors, and matting agents. Exemplary pigments include titanium dioxide, calcium carbonate, diatomaceous earth, mica, hydrated aluminum oxide, barium sulfate, calcium silicate, clay, silica, talc, zinc oxide, aluminum silicate, and mixtures thereof. For colored paints, desired colorants are added to the waterborne coating compositions. Examples of useful colorants include metallic oxides, synthetic organic pigments, and carbon black.

Paint comprising a latex composition as disclosed herein can be prepared using techniques known in the art. Waterborne compositions are typically prepared in four stages, the first of which is commonly referred to as the pre-thin stage. A latex composition as disclosed herein can be prepared in the pre-thin stage and combined with a secondary binder if desired, chase water, and defoamer to form a pre-thin mixture. The pre-thin mixture comprising a latex composition as disclosed herein can then proceed through the grind stage, the wash stage, and the thindown stage to prepare the paint.

The latex compositions disclosed herein can also be useful in adhesives, films, coatings, and binders. In these applications, the latex composition is present in a dry form in an adhesive, film, coating, or binder. As used herein, the term "in a dry form" refers to a latex composition comprising polysaccharide particles and a polymer dispersion or polymer emulsion dispersed in an aqueous solution, wherein at least a portion of the aqueous solution has been removed, for example by evaporation of the aqueous solution (i.e., drying). In one embodiment, the latex composition in a dry form is essentially free of the aqueous solution originally present, for example containing less than about 5% aqueous solution by weight, based on the total weight of polysaccharide solids, polymer solids, and aqueous solution before drying. In another embodiment, the latex composition in a dry form contains at least 5 weight percent less aqueous solution than before drying, based on the total weight of polysaccharide solids, polymer solids, and aqueous solution before drying. For example, the latex composition in a dry form can contain at least 5, 10, 15, 20, 25, 30, 35, 40, 45, 50, 55, 60, 65, 70, 75, 80, 85, 90, 95, 96, 97, 98, 99, or 100 weight percent (or any value between 5 wt % and 100 wt %), less of the aqueous solution by weight, based on the total weight of polysaccharide solids, polymer solids, and aqueous solution before drying. In a dry form, the polysaccharide particles and the polymer particles are dispersed in the solid film, coating, or adhesive that is formed as the aqueous solution is removed. In one embodiment, a dry form of the latex composition further comprises any additives which were included in the latex composition before drying. Removal of at least a portion of the aqueous solution (drying) can be performed at ambient temperature, at temperatures below ambient temperature, or at temperatures above ambient temperature. Removal of at least a portion of the aqueous solution can be performed under ambient conditions, or under an air or gas stream.

Also disclosed herein are articles comprising an adhesive, film, coating, or binder comprising a latex composition in a dry form as disclosed herein. Such articles, also referred to herein as coated articles, comprise a substrate having at least one surface on which is disposed the coating, adhesive, film, or binder, in a substantially continuous or discontinuous manner, depending on the desired end use of the coated article.

In one embodiment, the article comprises paper, leather, wood, metal, polymer, a fibrous substrate, or an architectural surface. By "architectural surface" is meant an external or internal surface of a building, including but not limited to a residential building, a commercial building, a medical building, or an educational or entertainment or sporting venue. In some embodiments, the article can comprise a porous substrate such as paper, textiles, or leather. In some embodiments, the article comprises paper, cardboard, paperboard, corrugated board, a cellulosic substrate, a textile, or leather. In other embodiments, the article can comprise a hard material such as wood, metal, masonry, drywall, plaster, or an architectural surface. In additional embodiments, the article can comprise a polymer. In one embodiment, the article can comprise a polymer such as polyamide, polyolefin, polylactic acid, polyethylene terephthalate (PET), poly(trimethylene terephthalate) (PTT), aramid, polyethylene sulfide (PES), polyphenylene sulfide (PPS), polyimide (PI), polyethylene imine (PEI), polyethylene naphthalate (PEN), polysulfone (PS), polyether ether ketone (PEEK), polyethylene, polypropylene, poly(cyclic olefins), poly(cyclohexylene dimethylene terephthalate), poly(trimethylene furandicarboxylate) (PTF), and cellophane. In one embodiment, the article comprises a polymer comprising polyethylene, polypropylene, poly lactic acid, poly(ethylene terephthalate), poly(trimethylene terephthalate), polyamide, or poly(trimethylene furandicarboxylate).

In some embodiments, the article comprises a fibrous substrate such as fabric or a garment. In one embodiment, a coated article comprises a fibrous substrate having a surface, wherein the surface comprises a coating comprising the latex composition as disclosed herein in a dry form on at least a portion of the surface.

Fibrous substrates can include fibers, yarns, fabrics, fabric blends, textiles, nonwovens, paper, leather, and carpets. In one embodiment, the fibrous substrate is a fiber, a yarn, a fabric, a textile, or a nonwoven. The fibrous substrates can contain natural or synthetic fibers, including cotton, cellulose, wool, silk, rayon, nylon, aramid, acetate, polyurethaneurea, acrylic, jute, sisal, sea grass, coir, polyamide, polyester, polyolefin, polyacrylonitrile, polypropylene, polyaramid, or blends thereof. By "fabric blends" is meant fabric made of two or more types of fibers. Typically, these blends are a combination of at least one natural fiber and at least on synthetic fiber, but also can include a blend of two or more natural fibers or of two or more synthetic fibers. Nonwoven substrates include, for example, spun-laced nonwovens such as SONTARA® available from DuPont and spun-bonded-meltblown-spun-bonded nonwovens.

In one embodiment, the adhesive, coating, film, or binder comprising a latex composition in a dry form is disposed in a substantially continuous layer on at least one surface of the substrate. In another embodiment, the adhesive, coating, film, or binder is disposed in a substantially continuous layer on more than one surface of the substrate. The phrase "substantially continuous layer" means a layer of a composition applied to at least a portion of a substrate, wherein a dried layer of the composition covers greater than or equal to 99% of the surface to which it has been applied and having less than 1% voids in the layer that expose the substrate surface. The greater than or equal to 99% of the surface to which the layer has been applied excludes any area of the substrate to which the layer has not been applied. For example, a continuous layer can be applied to only a portion of a substrate and still be considered a continuous layer to the area which the layer has been applied.

The adhesive, coating, film, or binder can be present on the substrate as a dried coating layer having a thickness in the range of from about 0.1 micrometers (μm) to about 100 μm, or from about 0.5 μm to about 80 μm, or from about 0.5 μm to about 60 μm, or from about 0.5 μm to about 40 μm, or from about 1 μm to about 30 μm, or from about 1 μm to about 20 μm. Alternatively, the thickness of the dried coating layer can be at least about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 74, 75, 76, 77, 78, 79, 80, 81, 82, 83, 84, 85, 86, 87, 88, 89, 90, 91, 92, 93, 94, 95, 96, 97, 98, 99, or 100 μm. If desired, the adhesive, film, coating, or binder can have thickness greater than 100 μm.

A latex composition comprising polysaccharide particles and a polymer dispersion or polymer emulsion dispersed in an aqueous solution, optionally containing one or more additives, can be applied to the substrate of an article using methods known in the art. After application of the latex composition, at least a portion of the aqueous solution is removed, for example by drying, to provide an adhesive, film, coating, or binder comprising the latex composition in a dry form. Application methods include air knife coating, rod coating, bar coating, wire bar coating, spray coating, brush coating, cast coating, flexible blade coating, gravure coating, jet applicator coating, short dwell coating, slide hopper coating, curtain coating, flexographic coating, size-press coating, reverse roll coating, and transfer roll coating. The latex composition can be applied on at least a portion of the substrate, for example, on a single side or both sides of the substrate, a portion of a single side, or a portion of both sides of a flat substrate. The solution of coating composition can be applied once to the substrate or multiple times to the substrate.

A film, coating (including paint), adhesive, or binder comprising a latex composition in a dry form as disclosed herein can comprise at least one property of:
  a) increased hardness;
  b) reduced tackiness;
  c) decreased gloss (i.e. providing a matte effect);
  d) increased shear strength (for an adhesive); or
  e) increased opacity
in comparison to that of a film, coating, adhesive, or binder of comparable thickness and analogous composition except lacking the polysaccharide particles, and wherein the at least one property is evaluated using the same method, for example using methods disclosed in the Examples herein. A film or coating comprising a latex composition in a dry form as disclosed herein can provide benefits such as increased coating hardness, improved dry time, improved fade resistance, lower blistering, and improved hand (a less tacky feel).

Non-limiting examples of the latex compositions, articles comprising the latex compositions, and methods disclosed herein include:

1. An aqueous latex composition comprising polysaccharide particles, and a polymer dispersion or polymer emulsion.

2. The latex composition of embodiment 1, wherein the polysaccharide particles comprise at least one polysaccharide comprising:

i) poly alpha-1,3-glucan;
ii) poly alpha-1,3-1,6-glucan;
iii) a poly alpha-1,3-glucan ester compound represented by Structure 1:

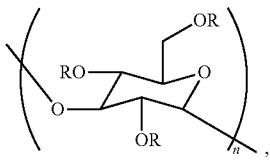

Structure 1 wherein
(A) n is at least 6;
(B) each R is independently an —H or a first group comprising —CO—$C_x$—COOH, wherein the —$C_x$— portion of said first group comprises a chain of 2 to 6 carbon atoms; and
(C) the compound has a degree of substitution with the first group of about 0.001 to about 3;

iv) a poly alpha-1,3-glucan ester compound represented by Structure 2:

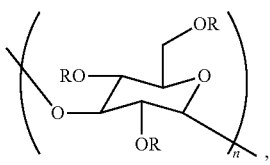

Structure 2 wherein
(i) n is at least 6,
(ii) each R is independently an H or an acyl group, and
(iii) the compound has a degree of substitution of about 0.001 to about 3.0;

v) a poly alpha-1,3-glucan ether compound represented by Structure 3:

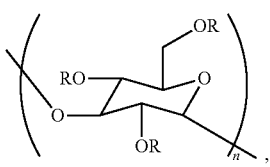

Structure 3 wherein
(A) n is at least 6,
(B) each R is independently an H or an organic group, and
(C) the compound has a degree of substitution of about 0.001 to about 3.0;

vi) a poly alpha-1,3-glucan ether compound represented by Structure 4:

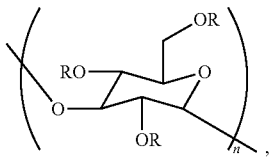

Structure 4 wherein
(A) n is at least 6,
(B) each R is independently an H or a positively charged organic group, and
(C) the compound has a degree of substitution of about 0.001 to about 3.0;

or a combination thereof.

3. The latex composition of embodiment 1 or 2, wherein the polysaccharide particles have an average particle size in at least one dimension in the range of from about 20 nm to about 5000 microns.

4. The latex composition of embodiment 1, 2, or 3, wherein the polysaccharide particles are present at an amount in the range of from about 0.01 weight percent polysaccharide solids to about 75 weight percent polysaccharide solids, based on the total weight of polysaccharide and polymer solids.

5. The latex composition of embodiment 1, 2, 3, or 4, wherein the polysaccharide particles comprise poly alpha-1,3-glucan.

6. The latex composition of embodiment 1, 2, 3, or 4, wherein the polysaccharide particles comprise poly alpha-1,3-1,6-glucan.

7. The latex composition of embodiment 1, 2, 3, or 4, wherein the polysaccharide particles comprise a poly alpha-1,3-glucan ester compound represented by Structure 1:

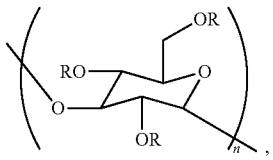

Structure 1 wherein
(A) n is at least 6;
(B) each R is independently an —H or a first group comprising —CO—$C_x$—COOH, wherein the —$C_x$— portion of said first group comprises a chain of 2 to 6 carbon atoms; and
(C) the compound has a degree of substitution with the first group of about 0.001 to about 3.

8. The latex composition of embodiment 1, 2, 3, or 4, wherein the polysaccharide particles comprise a poly alpha-1,3-glucan ester compound represented by Structure 2:

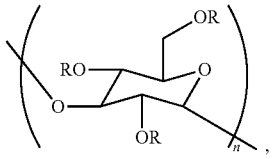

Structure 2 wherein
  (i) n is at least 6,
  (ii) each R is independently an H or an acyl group, and
  (iii) the compound has a degree of substitution of about 0.001 to about 3.0.
9. The latex composition of embodiment 1, 2, 3, or 4, wherein the polysaccharide particles comprise a poly alpha-1,3-glucan ether compound represented by Structure 3:

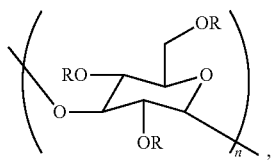

Structure 3 wherein
  (A) n is at least 6,
  (B) each R is independently an H or an organic group, and
  (C) the compound has a degree of substitution of about 0.001 to about 3.0.
10. The latex composition of embodiment 1, 2, 3, or 4, wherein polysaccharide particles comprise a poly alpha-1,3-glucan ether compound represented by Structure 4:

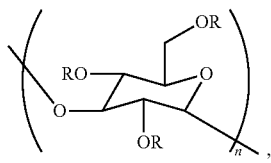

Structure 4 wherein
  (A) n is at least 6,
  (B) each R is independently an H or a positively charged organic group, and
  (C) the compound has a degree of substitution of about 0.001 to about 3.0.
11. The latex composition of embodiment 1, 2, 3, 4, 5, 6, 7, 8, 9, or 10, wherein the polymer dispersion or polymer emulsion comprises a polymer polymerized from at least one copolymerizable monoethylenically unsaturated monomer; polyurethane; epoxy; a rubber elastomer; or a combination thereof.
12. The latex composition of embodiment 1, 2, 3, 4, 5, 6, 7, 8, 9, or 10, or 11, wherein the polymer dispersion or polymer emulsion comprises a polymer polymerized from one or more copolymerizable monoethylenically unsaturated monomers.
13. The latex composition of embodiment 1, 2, 3, 4, 5, 6 7, 8, 9, 10, 11, or 12, wherein the one or more copolymerizable monoethylenically unsaturated monomer comprises vinyl monomers, acrylic monomers, allylic monomers, acrylamide monomers, monocarboxylic unsaturated acids, dicarboxylic unsaturated acids, or a mixture thereof.
14. The latex composition of embodiment 1, 2, 3, 4, 5, 6, 7, 8, 9, 10, 11, 12, or 13, wherein the one or more copolymerizable monoethylenically unsaturated monomer comprises vinyl monomers, acrylic monomers, or a mixture thereof.
15. The latex composition of embodiment 1, 2, 3, 4, 5, 6, 7, 8, 9, 10, 11, 12, 13, or 14, wherein the polymer dispersion or polymer emulsion comprises polyurethane.
16. The latex composition of embodiment 1, 2, 3, 4, 5, 6, 7, 8, 9, 10, 11, 12, 13, 14, or 15, wherein the polymer dispersion or polymer emulsion comprises epoxy.
17. The latex composition of embodiment 1, 2, 3, 4, 5, 6, 7, 8, 9, 10, 11, 12, 13, 14, 15, or 16, wherein the polymer dispersion or polymer emulsion comprises a rubber elastomer.
18. The latex composition of embodiment 1, 2, 3, 4, 5, 6, 7, 8, 9, 10, 11, 12, 13, 14, 15, 16, or 17, wherein the rubber elastomer comprises natural rubber, synthetic polyisoprene, styrene butadiene copolymer rubber, ethylene propylene diene monomer rubber, hydrogenated nitrile butadiene rubber, polybutadiene, or neoprene.
19. The latex composition of embodiment 1, 2, 3, 4, 5, 6, 7, 8, 9, 10, 11, 12, 13, 14, 15, 16, 17, or 18, wherein the polymer dispersion or polymer emulsion comprises particles having an average particle size in at least one dimension in the range of from about 10 nm to about 2500 nm.
20. The latex composition of embodiment 1, 2, 3, 4, 5, 6, 7, 8, 9, 10, 11, 12, 13, 14, 15, 16, 17, 18, or 19, wherein the polymer of the polymer dispersion or polymer emulsion is present at an amount in the range of from about 0.5 weight percent polymer solids to about 90 weight percent polymer solids, based on the total weight of polysaccharide and polymer solids.
21. The latex composition of embodiment 1, 2, 3, 4, 5, 6, 7, 8, 9, 10, 11, 12, 13, 14, 15, 16, 17, 18, 19, or 20, further comprising an organic solvent. 22. The latex composition of embodiment 1, 2, 3, 4, 5, 6, 7, 8, 9, 10, 11, 12, 13, 14, 15, 16, 17, 18, 19, 20, or 21, further comprising one or more additives.
23. The latex composition of embodiment 1, 2, 3, 4, 5, 6, 7, 8, 9, 10, 11, 12, 13, 14, 15, 16, 17, 18, 19, 20, 21, or 22, wherein the additive is a dispersant, rheological aid, antifoam, foaming agent, adhesion promoter, flame retardant, bactericide, fungicide, preservative, optical brightener, pigment, filler, anti-settling agent, coalescing agent, humectant, buffer, colorant, viscosity modifier, viscosity modifier, antifreeze, surfactant, binder, crosslinking agent, anticorrosion agent, hardener, pH regulator, salt, thickener, plasticizer, stabilizer, extender, matting agent, or a combination thereof.
24. A paint formulation comprising the latex composition of embodiment 1, 2, 3, 4, 5, 6, 7, 8, 9, 10, 11, 12, 13, 14, 15, 16, 17, 18, 19, 20, 21, 22, or 23.
25. An adhesive, film, coating, or binder comprising the latex composition of embodiment 1, 2, 3, 4, 5, 6, 7, 8, 9, 10, 11, 12, 13, 14, 15, 16, 17, 18, 19, 20, 21, 22, or 23 in a dry form.
26. A film, coating, adhesive, or binder of embodiment 25, wherein the film, coating, adhesive, or binder comprises at least one property of a) increased hardness; b) reduced tackiness; c) decreased gloss; d) increased shear strength; or e) increased opacity in comparison to that of a film, coating, adhesive, or binder of comparable thickness and analogous composition except lacking the polysaccharide particles, and wherein the at least one property is evaluated using the same method.
27. An article comprising the adhesive, film, coating, or binder of embodiment 25 or 26.
28. The article of embodiment 27, wherein the article is paper, leather, wood, metal, polymer, a fibrous substrate, or an architectural surface.
29. A method of making a latex composition, the method comprising the steps of: a) providing polysaccharide particles; b) providing a polymer dispersion or polymer emulsion; c) combining the polysaccharide particles and the polymer dispersion or emulsion in an aqueous solution; and
d) subjecting the combination of step c) to high shear dispersing.

30. The method of embodiment 29, wherein the latex composition is a latex composition of embodiment 1, 2, 3, 4, 5, 6, 7, 8, 9, 10, 11, 12, 13, 14, 15, 16, 17, 18, 19, 20, 21, 22, or 23.

EXAMPLES

Unless otherwise noted, all materials were used as received.

As used herein, "Comp. Ex." Means Comparative Example; "Ex." means Example; "g" means gram(s); "eq" means equivalent(s); "rpm" means revolutions per minute; "min" means minute(s); "μm" means microns; "cm" means centimeter; "kg" means kilogram(s); "lb" means pounds.

In some of the Tables, poly alpha-1,3-glucan is referred to as polysaccharide and abbreviated as PS.

Representative Preparation of Poly Alpha-1,3-Glucan

Poly alpha-1,3-glucan can be prepared using a gtfJ enzyme preparation as described in U.S. Pat. No. 7,000,000; U.S. Patent Appl. Publ. No. 2013/0244288, now U.S. Pat. No. 9,080,195; and U.S. Patent Appl. Publ. No. 2013/0244287, now U.S. Pat. No. 8,642,757 (all of which are incorporated herein by reference in their entirety).

Poly alpha-1,3-glucan polymer can be synthesized, and wet cake thereof prepared, following the procedures disclosed in U.S. Appl. Publ. No. 2014/0179913, now U.S. Pat. No. 9,139,718 (see Example 12 therein, for example), both of which are incorporated herein by reference in their entirety.

Wet cake poly alpha-1,3-glucan can be subjected to high shear mixing to form a colloidal dispersion, for example as disclosed in published patent application WO 2016/126685, which is incorporated herein by reference in its entirety.

Materials

Calcium carbonate (Huber 3G) was obtained from Huber Engineered Materials. Non-ionic aqueous epoxy dispersion (Epirez™ 7520-WD-52), water reducible polyamine curing agent (Epikure™ 8530-W-75) and Versatic acid (Versatic acid 10, neodecanoic acid) were obtained from Hexion. The epoxy dispersion is a non-ionic aqueous dispersion of a modified Epon™ resin 1001 solid epoxy resin that contains 52% solids, epoxy equivalent of about 525 g/eq, and viscosity of 1000-6000 cP. Glycerol ether solvents of varying volatility, Dowanol™ DPM and Dowanol™ DPnB, were purchased from Dow Chemical Company. Dispersant (Disperbyk® 194N) and rheology modifiers (BYK®-7420 ES and Optiflo® H600VF) were purchased from BYK Additives and Instruments. Foam controlling agent (Drewplus™ L-475) and TiO$_2$ (TiO$_2$ R706) were purchased from Ashland Inc. and The Chemours Company, respectively.

Examples 1-5

Poly Alpha-1,3-Glucan/Epoxy Formulations

Comparative Example A

Formulations

The waterborne epoxy, curing agent, anti-foam, rheology modifiers and solvents were accurately weighed into a container in the amounts shown in Table 1, and then put under a high-speed disperser with Cowles blades at 650 rpm. Particulate materials as pigments and/or fillers (TiO$_2$, CaCO$_3$ and poly alpha-1,3-glucan) and water were then added while mixing (amounts shown in Table 1). Once all the ingredients were combined, the speed of the disperser was increased to 3000 rpm and allowed to disperse the mixture for 10 min.

Comparative Example A was formulated using TiO$_2$ and CaCO$_3$ as the sole particulate fillers. Examples 1A and 1B were formulated by replacing 5% and 10% of CaCO$_3$ filler, respectively, with poly alpha-1,3-glucan powder that had an average particle size of 200 μm as measured by laser diffraction technique (Beckman Coulter LS13320), respectively. In Examples 2A, 2B, and 2C, poly alpha-1,3-glucan powder having a particle size of 5 μm measured using laser diffraction technique was used to replace 5%, 10% and 15% CaCO$_3$. The remaining ingredients of the waterborne epoxy formulation were maintained similar across each Example.

TABLE 1

Formulation Table for Dry Powder Poly Alpha-1,3-glucan Based Epoxy Coatings

| Formulation Ingredient (g) | Comp. Ex. A | Ex. 1A (5% PS loading) | Ex. 1B (10% PS loading) | Ex. 2A (5% PS loading) | Ex. 2B (10% PS loading) | Ex. 2C (15% PS loading) |
|---|---|---|---|---|---|---|
| Polysaccharide powder (200 μm) | — | 29.1 | 58.2 | — | — | — |
| Polysaccharide powder (5 μm) | — | — | — | 31.1 | 62.1 | 93.2 |
| CaCO$_3$ | 78.7 | 52.2 | 26.1 | 52.4 | 26.1 | 0 |
| Water | 222.2 | 220.7 | 219.3 | 218.9 | 215.4 | 211.9 |
| Curing agent | | | 56.6 | | | |
| Solvent (Dowanol™ DPM) | | | 3.7 | | | |
| Solvent (Dowanol™ DpnB) | | | 5.9 | | | |
| Versatic acid 10 | | | 11.3 | | | |
| Dispersant | | | 31.7 | | | |
| Rheology modifier (Optiflo® H600VF) | | | 3.8 | | | |
| Rheology modifier (BYK®-7420 ES) | | | 9.5 | | | |
| Anti-foam | | | 1.2 | | | |
| TiO$_2$ | | | 252.1 | | | |
| Waterborne epoxy | | | 429.9 | | | |

The materials and amounts used to prepare the formulations of Examples 3, 4A, 4B, 5A, and 5B are shown in Table 2. The amounts are given in grams on a dry weight basis. The formulations of Examples 3, 4A, and 4B were prepared by dispersing the poly alpha-1,3-glucan as wet cake directly in the formulation. In Examples 5A and 5B, the wet cake poly alpha-1,3-glucan was pre-dispersed in water and versatic acid using a high-speed disperser (3000 rpm for 5 min). Such pre-dispersed poly alpha-1,3-glucans were then mixed with the rest of the ingredients to provide 4.4% replacement of CaCO$_3$. While the slow mixing method was used to blend pre-dispersed poly alpha-1,3-glucan with the rest of the coating formulation of Example 5A, high speed mixing was employed for preparing the formulation of Example 5B.

TABLE 2

Formulation Table for Wet Poly Alpha-1,3-glucan Based Waterborne Epoxy Coatings

| Formulation Ingredient (g) | Comp. Ex. A | Ex. 3 (wet cake dispersed to form CDHV) | Ex.4A (wet cake, 5%) | Ex. 4B (wet cake, 10%) | Ex.5A (pre-dispersed wet cake, 4.4% slow speed mixing) | Ex.5B (pre-dispersed wet cake, 4.4% high speed mixing) |
|---|---|---|---|---|---|---|
| Wet cake CDHV | | 69.5 | | | | |
| Polysaccharide (Wet cake) | | | 69.1 | 138.2 | | |
| Pre-dispersed polysaccharide (Wet cake) | | | | | 60.8 | 60.8 |
| CaCO$_3$ | 78.7 | 52.8 | 52.6 | 26.1 | 55.5 | 55.5 |
| Water | 222.2 | 167.9 | 180.6 | 139.2 | 185.7 | 185.7 |
| Curing agent | | | | 56.6 | | |
| Solvent (Dowanol ™ DPM) | | | | 3.7 | | |
| Solvent (Dowanol ™ DpnB) | | | | 5.9 | | |
| Versatic acid 10 | | | | 11.3 | | |
| Dispersant | | | | 31.7 | | |
| Rheology modifier (Optiflo ® H600VF) | | | | 3.8 | | |
| Rheology modifier (BYK ®-7420 ES) | | | | 9.5 | | |
| Anti-foam | | | | 1.2 | | |
| TiO$_2$ | | | | 252.1 | | |
| Waterborne epoxy | | | | 429.9 | | |

Coating of the prepared formulations on metal plates (steel plates) was conducted using bird bar to provide a wet thickness of 3 mil.

Test Methods:

Viscosity and grind measurements were conducted on the formulated coating before application. Other tests were performed after application of the coating on the steel plates. In Table 3, the polysaccharide was used in "dry" powder form, and in Table form "wet" polysaccharides (wet cake, colloidal dispersion (CDHV) were used)

Paint Application for Opacity Measurement

Formulated paints (the formulations given in Table 1 and Table 2) were applied at a 3 mil wet film thickness using a Bird bar on a Leneta form 2C opacity chart, and allowed to dry overnight. The color was then measured over a white part of the chart using a X-Rite RM200QC.

Color

The color L*a*b* was read over the white part of the drawdown chart, and the total color difference (Delta E) from a standard was calculated as follows: $\Delta E = \sqrt{\Delta L^2 + \Delta a^2 + \Delta b^2}$ Opacity (Contrast Ratio)

The L value of the coated surface was measured over the white and black part of the chart. The opacity was then measured by taking the L value over the black part of the chart and dividing it by the L value over the white part of the chart. Larger numbers equate to better opacity, or hiding power.

Gloss

The gloss was measured using a tri-gloss glossmeter (20, 60, and 85 degree).

Physical Properties:

Grind

The fineness of grind was measured using a fineness of grind gauge in accordance with ASTM D-1210. In this method, the paint placed at the top of the gauge is pulled down using a scraper, and the grind was reported using the Hegman scale.

Viscosity

The viscosity of the formulation at room temperature was read on a Brookfield Viscometer with the appropriate spindle. Viscosity readings were taken at 0.5, 1, 2.5, 5, 10, 20, 50, and 100 rpms to evaluate the rheology profile at low and high shear. The viscosity was then calculated using the RPM specific spindle factor multiplied by the viscometer measurement.

Cross Hatch Adhesion

Cross cut adhesion test is to evaluate the adhesion strength of coatings on metal substrates. The film on a coated metal plate was cut into a pattern of squares in accordance with ASTM D3359. Pressure sensitive tape was then applied over the cut and pulled off. It is then evaluated by how much coating film/paint is pulled off by the tape. The scale is from 0B to 5B with 0B having more than 65% pulled off areas, and 5B with no peeling or removal.

Pull-Off Adhesion

In this test, the surface of the coating paint is lightly sanded to provide good adhesion. Using an epoxy glue, Dollies are attached to the sanded paint surface and allowed to cure for 24 hours. The force required to pull a specified test diameter of coating away from its substrate using hydraulic pressure is measured Using PosiTest® Pull-Off Adhesion Tester and reported in pounds per square inch (PSI).

Mandrel Bend

Coated test panel was placed with the uncoated side over and in contact with the selected mandrel with a minimum of two inches overhang and ensuring that there is clearance for the other end of the panel to pass the adjacent mandrel. Then by using a steady pressure of the fingers, the panel was bent by approximately 180 degrees around the mandrel in about one second. The coated panel was then removed and examined immediately for cracking of the coating visible to naked eye. The smallest diameter at which no cracking occurs is recorded.

Hardness

A hardness pencil fixed at a 45° angle to the surface of the painted panel was translated across the surface of the panel. The hardness was then reported as the hardest pencil that does not cut the film. The hardness of the pencils used here range from 9B (softest) to 9H (hardest).

Reverse Impact

A coated test specimen panel, by which the coating is fully cured, was placed upside down (coated side down) and the weight is dropped from a specific height, which was translated into an impact in PSI. The height is raised on successive trials until the coating fails. Failure is recorded when the coating cracks or when there is loss of adhesion.

Salt Spray (Corrosion Resistance)

Salt spray was performed using a standard salt spray chamber with the chamber temperature at 35° C. (ASTM-B-117). The corrosion resistance was then evaluated by corrosion at the scribe, rust through, and creep from the scribe.

QUV (Exposure to Ultraviolet (UV) Light)

Accelerated weathering was conducted in a standard QUV using UVA lamps. Coated specimens were exposed to 4 h UV at 60° C. and 4 h condensation at 50° C. weathering cycles. This cycle was repeated over the course of the exposure test. The optical properties (i.e. color and gloss) were measured at different time points and the samples were returned to the exposure cabinet.

Results are shown in Tables 3 and 4.

TABLE 3

Properties of Dry Polysaccharide-based Waterborne Epoxy Coating Formulations

| Properties | Comp. Ex. A | Ex. 1A (200 μm, 5% loading) | Ex. 1 B (200 μm, 10% loading) | Ex. 2A (5 μm, 5% loading) | Ex. 2B (5 μm, 10% loading) | Ex. 2C (5 μm, 15% loading) |
|---|---|---|---|---|---|---|
| Hegman grind | 6.5 | 0 | 0 | 4.5 | 4.0 | 4.0 |
| Viscosity (0.5 rpm, Cpoise × 1000) | 0.1 | 1.1 | 9.2 | 3.2 | 9.0 | 26.8 |
| Viscosity (20 rpm, Cpoise × 1000) | 0.4 | 1.1 | 2.9 | 1.0 | 2.4 | 5.6 |
| Cross hatch adhesion | 5B | 5B | 5B | 5B | 5B | 5B |
| Pull of adhesion | 373 | 378 | 377 | 376 | 376 | 374 |
| Flexibility (⅛ Mandel bend) | Passed | Passed | Passed | Passed | Passed | Passed |
| Pencil Hardness/Scratch | Passed 2H, failed 3H | Passed 2H, failed 3H | Passed 2H, failed 3H | Passed 2H, failed 3H | Passed 2H, failed 3H | Passed 2H, failed 3H |
| Reverse impact resistance (PSI) | 10 | 10 | 9.8 | 9.6 | 9.9 | 9.8 |
| Optical properties | | | | | | |
| 20 Deg gloss | 5.3 | 4.6 | — | 2.5 | 2.4 | 2.1 |
| 60 Deg gloss | 30.8 | 22.6 | — | 14.4 | 11.7 | 9.0 |
| 85 Deg gloss | 67.1 | 42.9 | — | 42.2 | 33.5 | 19.3 |
| Delta L* (White) | 0.00 | 2.10 | — | 0.5 | 2.1 | 2.0 |
| Delta a* (−Green + Red) | 0.0 | −0.20 | — | 0.3 | 0.4 | 0.3 |
| Delta b* (−Blue + Yellow) | 0.0 | −0.50 | — | −0.5 | −0.6 | −1.2 |
| Delta E | 0.0 | 2.17 | — | 0.77 | 2.22 | 2.35 |
| Opacity (Y) | 82.5 | 83.0 | — | 87.4 | 91.4 | 92.4 |
| Green tint | | | | | | |
| L* (Whiteness) | 82.40 | | | 83.0 | | |
| Delta L* (Whiteness) | 0.0 | | | 0.6 | | |
| Delta E | 0.00 | | | 3.64 | | |

TABLE 4

Properties of the Wet Polysaccharide Formulated Waterborne Epoxy Coatings

| Properties | Comp. Ex. A | Ex. 3 (wet cake dispersed to form CDHV 2.5%) | Ex. 4A (wet cake, 5%) | Ex. 4B (wet cake, 10%) | Ex. 5A (pre-dispersed wet cake, 4.4% slow speed mixing) | Ex. 5B (pre-dispersed wet cake, 4.4% high speed mixing) |
|---|---|---|---|---|---|---|
| Hegman grind | 6.5 | 3.5 | 2 | 2 | 2.0 | 2.5 |
| Viscosity (0.5 rpm, | 0.1 | 19.8 | 4.2 | 40.8 | 28.5 | 32 |

TABLE 4-continued

Properties of the Wet Polysaccharide Formulated Waterborne Epoxy Coatings

| Properties | Comp. Ex. A | Ex. 3 (wet cake dispersed to form CDHV 2.5%) | Ex. 4A (wet cake, 5%) | Ex. 4B (wet cake, 10%) | Ex. 5A (pre-dispersed wet cake, 4.4% slow speed mixing) | Ex. 5B (pre-dispersed wet cake, 4.4% high speed mixing) |
|---|---|---|---|---|---|---|
| Cpoise × 1000) | | | | | | |
| Viscosity (20 rpm, Cpoise × 1000) | 0.4 | 4.0 | 1.1 | 8.3 | 5.2 | 5.6 |
| Cross hatch adhesion | 5B | 5B | 5B | 5B | 5B | 5B |
| Pull of adhesion | 374 | 374 | 377 | 375 | 374 | 375 |
| Flexibility (⅛ Mandel bend) | Passed | Passed | Passed | Passed | Passed | Passed |
| Pencil Hardness/Scratch | Passed 2H, failed 3H | Passed 2H, failed 3H | Passed 2H, failed 3H | Passed 2H, failed 3H | Passed 2H, failed 3H | Passed 2H, failed 3H |
| Reverse impact resistance (PSI) | 9.9 | 9.7 | 9.8 | 10 | 9.9 | 9.9 |
| Optical properties | | | | | | |
| 20 Deg gloss | 5.3 | 1.9 | 2.2 | 1.8 | 1.8 | 1.7 |
| 60 Deg gloss | 30.8 | 13.1 | 11.7 | 6.0 | 9.3 | 9.0 |
| 85 Deg gloss | 67.1 | 40.4 | 30.7 | 15.8 | 15.1 | 17.4 |
| Delta L* (White) | 0.0 | 1.7 | 1.4 | 2.9 | 1.7 | 2.7 |
| Delta a* (−Green + Red) | 0.0 | 0.4 | 0.3 | 0.4 | 0.4 | 0.2 |
| Delta b* (−Blue + Yellow) | 0.0 | −1.1 | −0.8 | −0.7 | −1.2 | −1.4 |
| Delta E | 0.0 | 2.06 | 1.64 | 3.01 | 2.12 | 3.05 |
| Opacity (Y) | 82.5 | 91.6 | 92.20 | 92.30 | 91.60 | 96.10 |
| Green tint | | | | | | |
| L* (Whiteness) | 82.40 | 84.50 | | | | 85.7 |
| Delta L* (Whiteness) | 0.0 | 2.10 | | | | 3.30 |
| Delta E | 0.00 | 3.64 | | | | 5.57 |

The following conclusions were drawn based on the results reported in Tables 3 and 4.

1. Dispersion

The 5 µm dry polysaccharide powder dispersed quite readily (Hegman 4), directly into the water-based system up to 15% concentration (on total solids basis) using a high-speed dispersing blade. The 200 µm dry poly alpha-1,3-glucan powder did not disperse as well into the water based epoxy system.

The standard wet-cake poly alpha-1,3-glucan poorly dispersed directly into the water based system (Hegman 2); however, the wet cake dispersed as CDHV (high surface area poly alpha-1,3-glucan) exhibited excellent dispersion (Hegman 3.5). The excellent dispersion is attributed to the high surface area and good exfoliation of CDHV polysaccharides. Moreover, the CDHV resulted in a unique viscosity development of the formulation, and only 2.5% loading, based on total solids concentration provided good properties.

Pre-dispersing the wet-cake in water (slightly acidic) with either a blender or a high speed dispersing blade did not change Hegman gauge measured value. However, the overall rheology has changed significantly as a result of the pre-dispersion resulting in a gel-like dispersion. The observed build in viscosity for the pre-dispersed material is consistent with this morphology change.

The dispersion was found to be stable over a duration of at least 4 weeks.

2. Viscosity of Formulations

The viscosity behavior of the polysaccharide formulated waterborne epoxy coating exhibited a sheer thinning effect, which can be advantageous for brush, roll, and spray applications.

The thickening power of the polysaccharide material seems to be quite remarkable at small loading concentrations. This is desirable as it allows reduction of or replacement of viscosity/rheology modifiers with polysaccharide. This is because common rheology modifiers used in coating applications are derived from petroleum resources through a non-green process, and some of them can also be costly.

Overall, it appears that the polysaccharide material could be used as a sole rheology modifier (thickening agent) in the waterborne epoxy formulations, at relatively low concentrations. Such modifiers are expected to result in reduced sagging, spattering and reduced leveling during applications as a coating using conventional spraying or brushing methods. Moreover, such rheology performance of the polysaccharides could translate well over to other architectural water based coating formulations.

3. Physical Properties

Dry or wet cake forms of the poly alpha-1,3-glucan in the dry films did not lower the physical performance of the coating at the various concentrations tested (up to 15% total solids). These observations hold true for adhesion, hardness, flexibility, and impact resistance testing.

4. Optical Property Performance

Gloss studies at 20, 60 and 85 deg clearly showed that the use of polysaccharides in either dry or wet form resulted in loss of gloss of the coating (more matte appearance). This could be beneficial in applications where the matting effect is valued.

A change in L* from 94.3 (Comparative Example A) to 97 (high speed dispersed wet cake, Example 5B) represents a remarkable increase in whiteness. Moreover, a change in Opacity from 82.5 (Comparative Example A) to 96.1 (Example 5B) represents a notable change in hiding power. Overall, the optical property results presented in Tables 3 and 4 clearly demonstrate that replacing $CaCO_3$ with poly alpha-1,3-glucan resulted in an overall improvement of optical properties.

The incorporation of poly alpha-1,3-glucan in either powder or wet colloidal dispersion form (Examples 1A, 1B, 2A, 2B, and 2C) improved tinting strength as observed from improved whiteness. This clearly shows that the incorporation of polysaccharides would allow reduction of $TiO_2$ loading while maintaining the same color.

UV exposure data (FIGS. 1, 2, 3 and 4) demonstrates that inclusion of poly alpha-1,3-glucan in the formulation appears to protect the coating from yellowing and color development, while maintaining whiteness. The pre-dispersed wet-cake (Example 5B) shows the greatest protective effect.

6. Corrosion Performance

Visual inspection of corrosion progress studies in accordance with ASTM ASTM B 117 showed that the use of unmodified poly alpha-1,3-glucan in waterborne epoxy formulations in the absence of corrosion inhibitors degrades the corrosion resistance of the film.

The poor corrosion performance could possibly be mitigated by using corrosion inhibitors or modification of the poly alpha-1,3-glucan to increase its hydrophobicity.

Examples 6-9

Comparative Examples B, C, D, and E

Wood adhesive formulations were prepared and evaluated. TiteBond-II and TiteBond-III adhesives were purchased from Home Depot. Vinnapas®-323 and Vinnapas®-EP-6300 samples were obtained from Wacker Chemical Company. These samples were chosen because of their use in wood bonding applications. The Vinnapas®-323 is a poly(vinyl alcohol) stabilized vinyl acetate-ethylene (VAE) copolymer dispersion. The Vinnapas®-EP-6300 is a carboxylated, VAE copolymer dispersion. Titebond II is a cross-linking polyvinyl acetate. The solids content of the latex adhesives were reported by the supplier and verified by gravimetric analysis by drying the samples in an oven at 100° C. for two hours. The corresponding solids content for the Vinnapas® 323, Vinnapas® EP-6300, Titebond II, and Titebond III are 55%, 63%, 48%, and 52%.

For these examples the alpha-1,3-glucan was dried and ground to a d50 of approximately 9 micron.

Dry poly alpha-1,3-glucan powder was added to the latex samples and mixed using a high shear mixer and a Cowles Blade spinning at 1600 RPM. Additional water was added to the samples, as needed, to keep the total % solids the same as in the corresponding glucan-free reference latex. Specifically, all of the formulations with Vinnapas® 323 were kept at 55% solids, all of the formulations with Vinnapas® EP-6300 were kept at 63% solids, all of the formulations with Titebond II were kept at 48% solids, and all of the formulations with Titebond III were kept at 52% solids.

Samples were mixed for 5 minutes and checked with a metal spatula to ensure that there were no agglomerates.

The adhesive samples were made and tested using the ASTM D-905 standard test, outlined below:

1) Clear, straight grained, ¾ inch (1.9 cm) thick hard maple (*Acer saccharum*) boards were purchased from a local lumber store. The boards were weighed and measured prior to purchase in an attempt to find boards of adequate and similar density. The purchased boards were ripped to 5.5 inches (14 cm) wide and cut into 32 inch (81.3 cm) lengths. The surface of the boards were planed to ensure a fresh, smooth surface, and uniform thickness of the boards.
2) The boards were conditioned for two weeks (targeting a moisture content of 8-9%).
3) Billets were manufactured by gluing together two ¾ inch (1.9 cm) thick boards measuring 5.5 inches (14 cm) wide by 32 inches (81.3 cm) long. Adhesives were applied and spread by hand with a drywall knife. The amount of adhesive applied to each board was measured.
4) The billets were pressed in a 450 ton, 34 inches (86.4 cm)×34 inches (86.4 cm), PLC controlled Dieffenbacher hydraulic press. Four billets were pressed at a time, atop one another, for 90 minutes.
5) The adhered billets were taken out of the press and conditioned at 70° F./50% relative humidity (RH) for 7 days.
6) Each of the billets were cut into 20 block shear specimens as described in the ASTM D-905 method.

Samples were also tested using the APA Test Method D-4, which uses moisture cycling to accelerate the bond degradation.

Table 5 summarizes the billets prepared in Examples 6-9 and Comparative Examples B, C, D, and E, including the amount of formulation applied to each billet. The Comparative Examples did not contain any poly alpha-1,3-glucan. Poly alpha-1,3-glucan is referred to as "polysaccharide" in the Table.

TABLE 5

Formulation Compositions

| Example | Formulation Composition | Formulation Amount Applied (g) |
| --- | --- | --- |
| Comp. Ex. B | Vinnapas 323 | 48.3 |
| 6A | Vinnapas 323 + 10% Polysaccharide | 48.5 |
| 6B | Vinnapas 323 + 20% Polysaccharide | 49.4 |
| Comp. Ex. C | Vinnapas EP-6300 | 44.9 |
| 7 | Vinnapas EP-6300 + 10% Polysaccharide | 60.7 |
| Comp. Ex. D | Titebond II | 46.4 |
| 8A | Titebond II + 10% Polysaccharide | 47.4 |
| 8B | Titebond II + 20% Polysaccharide | 57.6 |
| Comp. Ex. E | Titebond III | 53.0 |
| 9 | Titebond III + 10% Polysaccharide | 46.3 |

Figure 5:
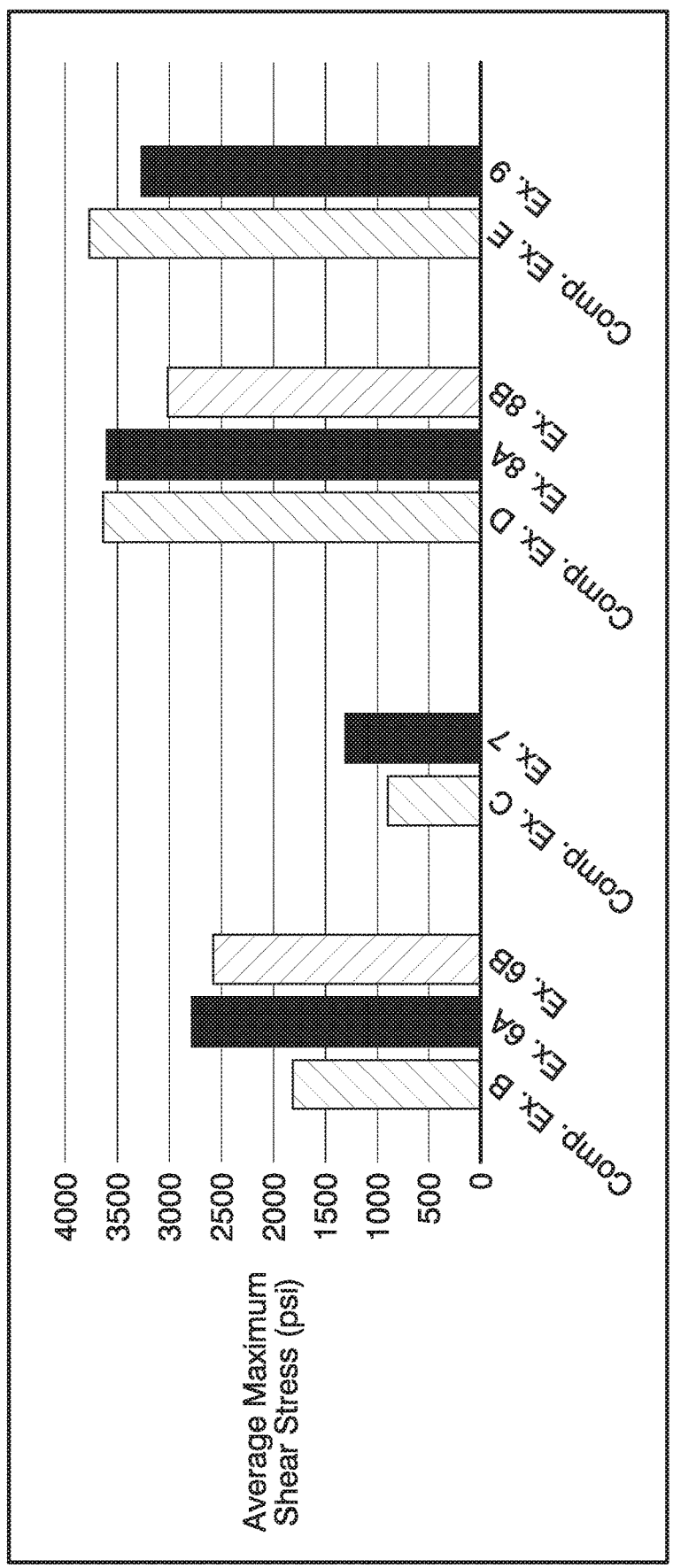
FIG. 5 is a graphical representation of average maximum shear stress for wood billets of Examples 6A, 6B, 7, 8A, 8B, and 9 and for Comparative Examples B, C, D, and E, measured according to the ASTM D-905 standard method.

The average maximum shear stress for each wood billet was recorded; the data is plotted in FIG. 5 and shown in Table 6 below.

TABLE 6

Average Maximum Shear Stress

| Example | Average Maximum Shear Stress (psi, ASTM D-905) | Average Maximum Shear Stress (psi, APA Test Method D-4) |
| --- | --- | --- |
| Comp. Ex. B | 1816.9 | 185.5 |
| 6A | 2781.5 | 208.6 |

TABLE 6-continued

Average Maximum Shear Stress

| Example | Average Maximum Shear Stress (psi, ASTM D-905) | Average Maximum Shear Stress (psi, APA Test Method D-4) |
|---|---|---|
| 6B | 2574.1 | 159.5 |
| Comp. Ex. C | 900.0 | 89.8 |
| 7 | 1297.5 | 82.2 |
| Comp. Ex. D | 3628.4 | 762.0 |
| 8A | 3595.9 | 219.0 |
| 8B | 3016.6 | 54.4 |
| Comp. Ex. E | 3769.6 | 901.8 |
| 9 | 3270.7 | 143.4 |

The Vinnapas samples (Examples 6A, 6B, and 7) on average have a lower maximum shear stress than the Titebond samples (Examples 8A, 8B, and 9).

The addition of the poly alpha-1,3-glucan significantly increases the strength of the Vinnapas resins. At 10% poly alpha-1,3-glucan addition in Vinnapas 323 there is a 53% increase in the average maximum shear stress, while at 20% poly alpha-1,3-glucan addition there is a 42% increase. However, the Vinnapas®-containing samples do not show a significant difference in the D4 average maximum shear stress when the polysaccharide is added.

The poly alpha-1,3-glucan addition to the Titebond samples does not have the same effect as in the Vinnapas samples. A 10% poly alpha-1,3-glucan addition to the Titebond III resin reduces the average maximum shear stress by 13%. A 10% poly alpha-1,3-glucan addition to the Titebond II resin does not show a significant difference, however at 20% poly alpha-1,3-glucan addition there is a 17% decrease in the average maximum shear stress for the Titebond resins.

Figure 6:
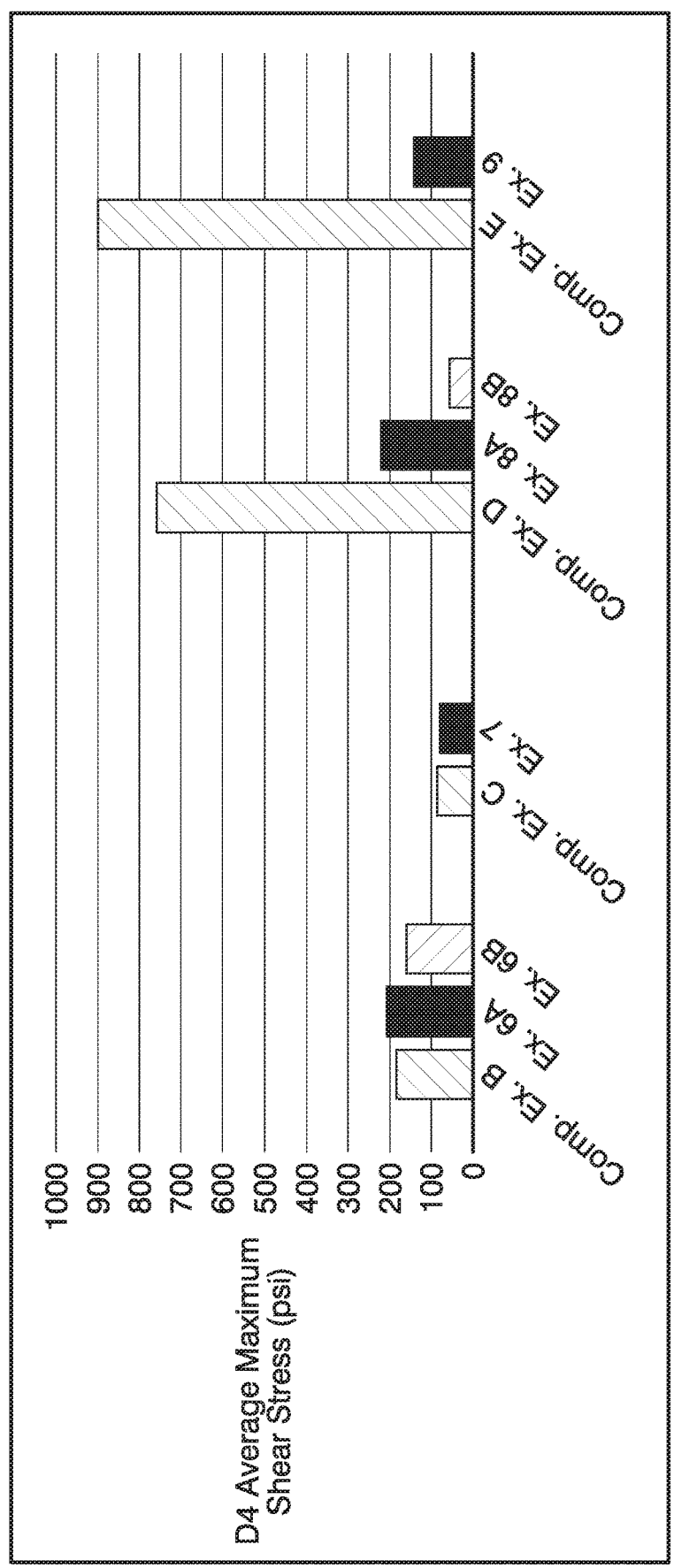
FIG. 6 is a graphical representation of average maximum shear stress after moisture cycling for wood billets of Examples 6A, 6B, 7, 8A, 8B, and 9 and for Comparative Examples B, C, D, and E, measured according to APS Test Method D-4.

The average maximum shear stress for each sample was recorded after moisture cycling, and the data is plotted in FIG. 6. The Vinnapas samples (Examples 6A, 6B, and 7) on average have a lower maximum shear stress than the Titebond samples (Example 8A, 8B, and 9).

The Vinnapas samples do not show a significant difference in the average maximum shear stress when the poly alpha-1,3-glucan was added. There is a significant decrease in the average maximum shear stress when the poly alpha-1,3-glucan was added to the Titebond resin. For Titebond II samples (Examples 8A and 8B), there is a 79% and 94% decrease in the average maximum shear stress with the addition of 10 and 20% poly alpha-1,3-glucan, respectively.

Example 10

For Example 10, the alpha-1,3-glucan was dried and ground to a d50 of approximately 9 micron. The dry poly alpha-1,3-glucan powder was further dried in an oven for 3 days at a temperature of 60° C. prior to formulating into the polyurethane pre-polymers.

The isocyanate used in this Example was Mondur-MLQ, obtained from Covestro North America, LLC. The polyol used in this example was Jeffol PPG-2000, obtained from Huntsman. The catalyst used in this example was Jeffcat DMDLC, obtained from Hunstman.

To make the pre-polymer, 300 grams of Mondur MLQ was added to a reaction vessel contained within a controlled heating mantle. A dry nitrogen purge was used throughout the reaction. While the Mondur MLQ was heating and stirring, 100 grams of Jeffol PPG-2000 was slowly added to the reaction vessel. After all the PPG-2000 was added, 100 grams of dried 9 micron poly alpha-1,3-glucan was added.

The mixture was stirred continuously for 2 hours and the temperature maintained between 85-100° C. After 2 hours the polyurethane prepolymer was cooled to 70° C. and 2.5 grams of Jeffcat DMDLC was added, and the prepolymer stirred for an additional 30 minutes.

The polyurethane prepolymer containing poly alpha-1,3-glucan (Example 10) was tested using the ASTM D905 and APA Test method D-4. Gorilla glue was also tested using the same methods as a reference sample (Comparative Example F); no poly alpha-1,3-glucan was added to the Gorilla glue for Comparative Example F.

The average maximum shear stress for each binder system is shown below in Table 7. An ANOVA analysis employing a Holm multiple comparison method showed there was no significant difference in the average maximum shear stress measured from ASTM D905 or APA D-4.

TABLE 7

Shear Stress Results

| Formulation Composition | Average Maximum Shear Stress per ASTM D-905 (psi) | Average Maximum Shear Stress per APA Test Method D-4 (psi) |
|---|---|---|
| Comp. Ex. F (Gorilla Glue) | 1346.6 | 1481.7 |
| Example 10 | 1157.2 | 1141.7 |

Examples 11-14

VAE Flat Paint Formulations Containing Poly Alpha-1,3-Glucan

In Examples 11-14, poly alpha-1,3-glucan wet cake polymer was incorporated into a 55% PVC VAE flat architectural paint formulation while reducing the $TiO_2$ quantity. By weight, for every 45.4 kg (100 lb) reduction in $TiO_2$, approximately 32.2 kg (71 lb) of poly alpha-1,3-glucan wet cake was added in its place.

The components of the formulations are shown in Table 8, listed in order of addition. To make the paint formulations the initial water and AMP-95® (2-amino-2-methyl-1-propanol, obtained from Angus) were added to the mix tank and stirred at a slow speed. The alpha-1,3-glucan wet cake, approximately 40% solids, was then added and the speed was slowly increased on the disperser. After 5 minutes of mixing the Natrosol™ 330 thickener (Ashland) was added and allowed to dissolve. After 5 minutes the remaining additives and pigments were added (Rhodoline® 226, Igepal® CO-630 (Solvay), BYK® 022 (BYK), $TiO_2$ (Chemours), Hubercarb® G325 (calcium carbonate, obtained from Huber)), one at a time. The disperser speed was increased to 2800-3000 rpm and the formulation was allowed to mix for 10 minutes. The speed was then slowly decreased and the EcoVAE® resin (vinyl acetate ethylene copolymer emulsion, Celanese) was added. Finally, the propylene glycol (Eastman), Texanol™ (ester alcohol, Eastman), and remaining water was slowly added and the formulation was mixed for another 5 minutes.

TABLE 8

VAE Flat Paint Formulations

| Ingredient* | Comp. Ex. G | Ex. 11 | Ex. 12 | Ex. 13 | Ex. 14 |
|---|---|---|---|---|---|
| WATER | 128 | 128 | 128 | 128 | 128 |
| AMP-95 ® | 6 | 6 | 6 | 6 | 6 |
| ALPHA-1,3-GLUCAN WET CAKE | — | 27 | 54 | 81 | 108 |
| RHODOLINE ® 226 | 4 | 4 | 4 | 4 | 4 |
| IGEPAL ® CO-630 | 3 | 3 | 3 | 3 | 3 |
| BYK ® 022 | 6 | 6 | 6 | 6 | 6 |
| NATROSOL ™ 330 | 8 | 8 | 8 | 8 | 8 |
| TiO$_2$ (R-706) | 240 | 226 | 212 | 199 | 185 |
| HUBERCARB ® G325 | 359 | 359 | 359 | 359 | 359 |
| EcoVAE ® 405 | 327 | 327 | 327 | 327 | 327 |
| PROPYLENE GLYCOL | 6 | 6 | 6 | 6 | 6 |
| TEXANOL ™ | 6 | 6 | 6 | 6 | 6 |
| WATER | 333 | 315 | 298 | 281 | 263 |

*quantities are in kg/1000 liters

Viscosity measurements were conducted on the formulated paints before application. Optical and physical measurements were performed on drawn coatings.

Figure 7:
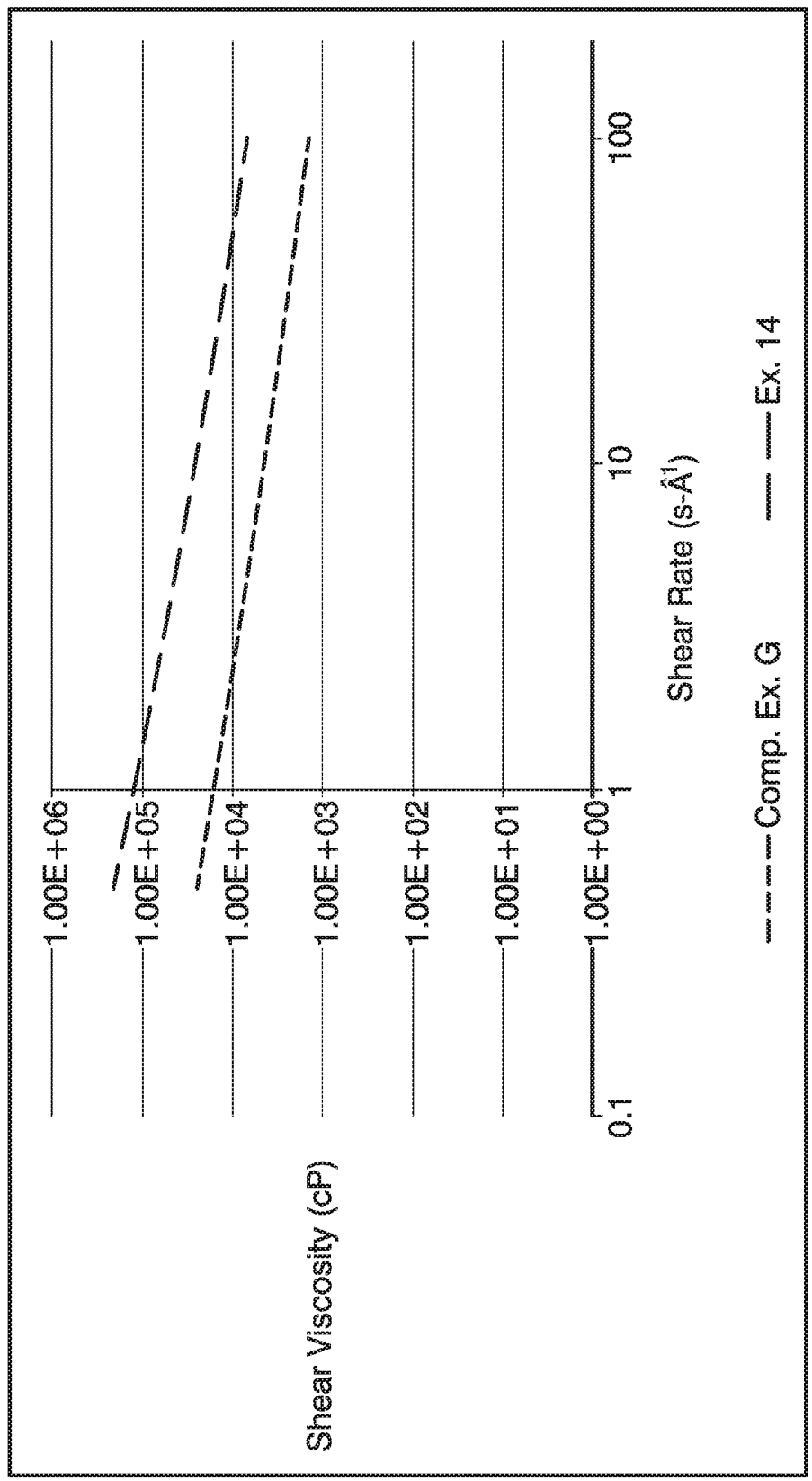
FIG. 7 is a graphical representation of the shear viscosity of formulated EVA flat paints of Example 14 and Comparative Example G.

The viscosity of the formulation at room temperature was read on a Brookfield Viscometer with the appropriate spindle. Viscosity readings were taken at 0.5, 1, 2.5, 5, 10, 20, 50, and 100 rpms to evaluate the rheology profile at low and high shear. The viscosity was then calculated using the RPM specific spindle factor multiplied by the viscometer measurement. Shear viscosity results are shown in FIG. 7.

The alpha-1,3-glucan wet cake significantly increased the viscosity of the paint, but was also shear thinning. The impact on viscosity imparts a favorable rheology to the paint formulation.

Films of the paint formulations were prepared on steel plates using a bird bar. The wet thickness of the films were 3 mil. The optical properties of these films were tested using the methods summarized below.

1. Paint Application for Opacity Measurement

Formulated paints (the formulations given in Table 8) were applied at a 3 mil wet film thickness using a Bird bar on a Leneta form 2C opacity chart, and allowed to dry overnight. The color was then measured over a white part of the chart using a X-Rite RM200QC.

2. Color

The color L*a*b* was read over the white part of the drawdown chart, and the total color difference (Delta E) from a standard was calculated as follows: $\Delta E = \sqrt{\Delta L^2 + \Delta a^2 + \Delta b^2}$ 3. Opacity (Contrast Ratio)

The L value of the coated surface was measured over the white and black part of the chart. The opacity was then measured by taking the L value over the black part of the chart and dividing it by the L value over the white part of the chart. Larger numbers equate to better opacity, or hiding power.

4. Gloss

The gloss was measured using a tri-gloss glossmeter (20, 60, and 85 degree).

5. Tint Strength

Colortrend 888 Series Phtalo Blue tint paste was added to each formulation given in Table 8 at a ratio of 1 pound (0.45 kg) for each 100 gallons (378.5 L) of paint. A film was drawn using a 3 mil bird bar and was allowed to dry overnight. The L*, a*, and b* is read and Delta E is calculated, as referenced above. A higher L* value shows that the paint is more white.

6. Scrub Test

Scrub is measured using a modified ASTM-D-2486 method B. A film is drawn using a 3 mil bird bar. The two formulations being compared are drawn side by side on the same sheet. A Gardener-scrub abrasion tester is used to measure scrub resistance for a certain number of cycles. The film abrasions are then visually compared.

A summary of the optical properties for each formulation are described in Table 9. At as much as a 23% reduction in TiO$_2$ there is no decrease in whiteness (L*) and the opacity (Y) increases, with the alpha-1,3-glucan wet cake in the formulation.

TABLE 9

Optical Properties of Formulated VAE Flat Paints

|  | Comp. Ex. G | Ex. 11 | Ex. 12 | Ex. 13 | Ex. 14 |
|---|---|---|---|---|---|
| % Reduction TiO$_2$ | 0 | 6% | 11% | 17% | 23% |
| 20 Deg Gloss | 1.2 | 1.1 | 1.1 | 1.1 | 1.1 |
| 60 Deg Gloss | 2.7 | 2.5 | 2.3 | 2.2 | 2.1 |
| 85 Deg Gloss | 1.3 | 1.2 | 1.1 | 1 | 1 |
| L* | 96.2 | 96.2 | 96.2 | 96 | 96 |
| a* | −0.7 | −0.6 | −0.6 | −0.6 | −0.6 |
| b* | 1.1 | 1.1 | 1.1 | 1.2 | 1.2 |
| Opacity (Y) | 92.1 | 93.5 | 92.9 | 92.6 | 92.4 |

Tinting strength is a measure of how much whiteness and brightness is added to the color of a tinted paint. The tint strength is largely unchanged from the reference at as much as 17% TiO$_2$ reduction when alpha-1,3-glucan is incorporated. At a 23% reduction in TiO$_2$ there is some reduction in the L* value. Table 10 shows the tinting strength data for formulated VAE flat paints.

TABLE 10

Tinting Strength Data for Formulate VAE Flat Paints

| Example | Comp. Ex. G | Ex. 11 | Ex. 12 | Ex. 13 | Ex. 14 |
|---|---|---|---|---|---|
| L* | 78.3 | 78.4 | 78.3 | 78.2 | 77.9 |
| A* | −13.1 | −13.1 | −13.1 | −13.2 | −13.3 |
| B* | −23.4 | −23.3 | −23.3 | −23.2 | −23.3 |
| DELTA E | 0 | 0.1 | 0.1 | 0.2 | 0.5 |

As TiO$_2$ loading is reduced and alpha-1,3-glucan loading is increased, the scrub resistance is reduced compared to the reference sample. The scrub resistance can be optimized by altering the PVC and adjusting the formulation.

TiO$_2$ can be replaced with alpha-1,3-glucan at a ratio of 0.71 at significant percentages without reducing the opacity, whiteness, or tint strength of the formulated paint. Alpha-1,3-glucan is less dense than TiO$_2$, so the paint is also lighter in weight at an equivalent volume. The scrub resistance of the paint formulation is somewhat reduced as the TiO$_2$ content is reduced and the alpha-1,3-glucan content is increased. It is believed that the formulation can be adjusted to minimize the decrease in scrub resistance.

What is claimed is:

1. An aqueous latex composition comprising polysaccharide particles, and a polymer dispersion or polymer emulsion;
   wherein the polysaccharide particles comprise at least one polysaccharide comprising:
   (i) a poly alpha-1,3-glucan ester compound represented by Structure 1:

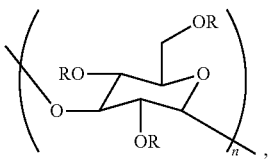

wherein
(A) n is at least 6,
(B) each R is independently an —H or a first group comprising —CO—$C_x$—COOH, wherein the —$C_x$— portion of said first group comprises a chain of 2 to 18 carbon atoms, and
(C) the poly alpha-1,3-glucan ester compound represented by Structure 1 has a degree of substitution with the first group of 0.001 to 3.0;

or (ii) a poly alpha-1,3-glucan ester compound represented by Structure 2:

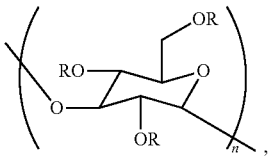

wherein
(A) n is at least 6,
(B) each R is independently an —H or an acyl group, and
(C) the poly alpha-1,3-glucan ester compound represented by Structure 2 has a degree of substitution with the acyl group of 0.001 to 3.0.

2. The latex composition of claim 1, wherein the polysaccharide particles have an average particle size in at least one dimension of 20 nm to 5000 microns.

3. The latex composition of claim 1, wherein the polysaccharide particles are present at 0.01 weight percent polysaccharide solids to 75 weight percent polysaccharide solids, based on the total weight of polysaccharide and polymer solids.

4. The latex composition of claim 1, wherein the polymer dispersion or polymer emulsion comprises a polymer polymerized from at least one of a (i) copolymerizable monoethylenically unsaturated monomer; ii) polyurethane; (iii) epoxy; or (iv) rubber elastomer.

5. The latex composition of claim 4, wherein the polymer dispersion or polymer emulsion comprises said polymer polymerized from at least one copolymerizable monoethylenically unsaturated monomer.

6. The latex composition of claim 5, wherein the at least one copolymerizable monoethylenically unsaturated monomer is a vinyl monomer, acrylic monomer, allylic monomer, acrylamide monomer, monocarboxylic unsaturated acid, or dicarboxylic unsaturated acid.

7. The latex composition of claim 4, wherein the polymer dispersion or polymer emulsion comprises said polyurethane.

8. The latex composition of claim 4, wherein the polymer dispersion or polymer emulsion comprises said rubber elastomer.

9. The latex composition of claim 8, wherein the rubber elastomer comprises natural rubber.

10. The latex composition of claim 8, wherein the rubber elastomer comprises synthetic polyisoprene, styrene butadiene copolymer rubber, ethylene propylene diene monomer rubber, hydrogenated nitrile butadiene rubber, polybutadiene, or neoprene.

11. The latex composition of claim 4, wherein the polymer dispersion or polymer emulsion comprises said epoxy.

12. The latex composition of claim 1, wherein the polymer dispersion or polymer emulsion comprises particles having an average particle size in at least one dimension of 10 nm to 2500 nm.

13. The latex composition of claim 1, wherein the polymer of the polymer dispersion or polymer emulsion is present at 0.5 weight percent polymer solids to 90 weight percent polymer solids, based on the total weight of polysaccharide and polymer solids.

14. The latex composition of claim 1, further comprising one or more additives selected from a dispersant, rheological aid, antifoam, foaming agent, adhesion promoter, flame retardant, bactericide, fungicide, preservative, optical brightener, pigment, filler, anti-settling agent, coalescing agent, humectant, buffer, colorant, viscosity modifier, antifreeze, surfactant, binder, crosslinking agent, anticorrosion agent, hardener, pH regulator, salt, thickener, plasticizer, stabilizer, extender, or matting agent.

15. The latex composition of claim 1, wherein the at least one polysaccharide comprises said poly alpha-1,3-glucan ester compound represented by Structure 1.

16. The latex composition of claim 15, wherein the —$C_x$— portion of said first group comprises a chain of 2 to 6 carbon atoms.

17. The latex composition of claim 1, wherein the at least one polysaccharide comprises said poly alpha-1,3-glucan ester compound represented by Structure 2.

18. A paint formulation comprising the latex composition of claim 1.

* * * * *